United States Patent
Saito et al.

(10) Patent No.: US 6,636,365 B2
(45) Date of Patent: Oct. 21, 2003

(54) OPTICAL PICKUP APPARATUS AND OBJECTIVE LENS

(75) Inventors: Shinichiro Saito, Hachioji (JP); Katsuya Sakamoto, Hachioji (JP)

(73) Assignee: Konica Corporation, Tokyo (JP)

( * ) Notice: Subject to any disclaimer, the term of this patent is extended or adjusted under 35 U.S.C. 154(b) by 88 days.

(21) Appl. No.: 09/965,088

(22) Filed: Sep. 28, 2001

(65) Prior Publication Data
US 2002/0064120 A1 May 30, 2002

(30) Foreign Application Priority Data
Oct. 2, 2000 (JP) ........................................ 2000-302749

(51) Int. Cl.[7] ................................................. G02B 3/02
(52) U.S. Cl. ........................ 359/719; 359/565; 359/721
(58) Field of Search ............................... 359/565, 719, 359/721, 722, 738, 739; 369/110.01–110.04, 112.01, 112.23–112.26

(56) References Cited

U.S. PATENT DOCUMENTS 5,886,970 A * 3/1999 Tachibana et al. ...... 369/112.07
2001/0008512 A1 * 7/2001 Maruyama ............. 369/112.08
2001/0015849 A1 * 8/2001 Ueda et al. .................. 359/571

* cited by examiner

Primary Examiner—Jordan M. Schwartz
Assistant Examiner—Jessica Stultz
(74) Attorney, Agent, or Firm—Finnegan, Henderson, Farabow, Garrett & Dunner, L.L.P.

(57) ABSTRACT

An optical pickup apparatus for first and second optical information recording medium, comprises first and second light sources to emit first and second light flux; a single objective lens made and a diaphragm having an aperture. The pitch of a plurality of ring-shaped diffractive zones provided on the objective lens, becomes gradually small from the optical axis to a point h and the pitch increases at the point h. At the time of conducting recording or reproducing information of the second optical information recording medium, the second light flux has a spherical aberration discontinuous portion at the point h where a spherical aberration-stepped amount is 7 µm to 40 µm, and a spherical aberration of a light ray of the second light flux having passed through the outermost portion of the aperture of the diaphragm is 7 µm to 40 µm.

34 Claims, 9 Drawing Sheets

US 6,636,365 B2

OPTICAL PICKUP APPARATUS AND OBJECTIVE LENS

BACKGROUND OF THE INVENTION

The present invention relates to an objective lens made of a plastic material that is used in a optical pickup apparatus, wherein, a light flux radiated from a laser light source is formed into a light spot by an objective lens on an information recording surface of an optical information recording medium through its transparent board, to record and/or reproduce information optically, and more particularly, to an objective lens wherein a first light source with a wavelength of $\lambda_1$ is used for recording and/or reproducing a first optical information recording medium, and a second light source with a wavelength of $\lambda_2$ is used for recording and/or reproducing a second optical information recording media, and corrects by a diffraction a spherical aberration that is produced by the difference between a thickness $t_1$ of the transparent base board of the first optical information recording medium and a thickness $t_2$ of the transparent base board of the second optical information recording medium.

With a short wavelength red semiconductor laser which has recently been put to practical use, there has been commercialized a high density DVD (digital versatile disc) that is the same in size as a conventional CD (compact disc) and has a larger capacity as an optical information recording medium. When information is recorded on this DVD or reproduced from this DVD, a semiconductor laser with a short wavelength of 635 nm or 650 nm and an objective lens with a numerical aperture (NA) of an approximate value of 0.6 are necessary.

Further, with a spread of a readable optical information recording medium CD-R (write-once read-many compact disc), an optical pickup apparatus is required to have the so called interchangeability of information recording medium that makes it possible to record and/or reproduce information for both CD-R and DVD.

However, since the necessary signals (reproducing signal, focus error signal and tracking error signal) cannot be obtained by a drop in the reflectance of CD-R in the short wavelength band, the semiconductor laser of wavelength 780 nm is prepared for CD-R, separately from the short wavelength semiconductor laser for DVD,.

Incidentally, for recording and/or reproducing information for CD-R (hereinafter referred to also as CD), the numerical aperture of the objective lens is required to have an approximate value of 0.45.

Incidentally, the required numerical aperture mentioned in the present specification is one that is calculated by a spot size d required on the optical information recording medium and wavelength $\lambda$ to be used and can be generally expressed by a formula $NA=0.83\lambda/d$.

Information recording surfaces of these optical information recording media are protected by the transparent base boards, and the thicknesses of the transparent base boards are determined by the specifications of each optical information recording medium, to be 0.6 mm for DVD and 1.2 mm for CD system respectively.

If there is no need to consider the interchangeability, the spherical aberration of the pick-up optical system may be designed to be optimum to the thickness of each transparent base board.

However, in order to realize the interchangeability between DVD and CD each having a different thickness of the transparent base board, some means are needed for the above-mentioned correction of the spherical aberration.

For example, in the official gazette of TOKUKAI No. 2000-81566, there is described the objective lens using the diffracted light in the optical pickup apparatus in which DVD and CD are different each other in terms of a wavelength to be used, as an example of means for correction of the spherical aberration.

A power of the diffractive lens can be divided into a power of a refractive section representing a basic aspheric surface and a power of a diffractive section. That is, a degree of freedom in designing can be increased even for a single lens, by introducing the diffractive action. Further, in the diffractive section, there is an effect that the power is proportional to the wavelength which is different from that in the refractive optical system.

By properly allocating the power of the diffractive section and the refractive section, the spherical aberration correction can be performed.

However, in case of recording and/or reproducing information for CD, if the spherical aberration correction is conducted on the outer side of the area covered by the necessary numerical number $NA_2=0.45$, a spot light is stopped down to be too small. Accordingly, in order to use a diaphragm having the common aperture size for DVD and CD, the spherical aberration must be designed so as to let the area outside $NA_2=0.45$ be a flare, when CD is used. Thus, in the so-called diffraction interchangeable lens that can converge the light flux properly for both of DVD and CD, the optical pickup apparatus can be constructed with a single objective lens and a single simple aperture diaphragm, by jointing the diffractive surfaces each being designed optically based on a different concept.

As mentioned above, the diffractive lens power is generally expressed by the sum of the diffractive section power and the refractive section power of the diffractive base surface. However, when a diffractive lens is made of a plastic material, there is observed a distinctive mark that the temperature characteristic and the wavelength characteristic are contrary each other. The reason will be explained as follows.

Let it be considered that the temperature of the diffractive lens has risen. By the increment of temperature, the laser wavelength becomes longer and the over spherical aberration is generated on the diffractive section, while the under spherical aberration is generated on the base refractive section due to the reduction of the refractive index caused by the temperature rise, therefore, the spherical aberrations are produced on the refractive section and the diffractive section wherein both of the spherical aberrations are canceling each other.

Accordingly, to perform the temperature compensation, the absolute values of the spherical aberrations generated on the refractive section and the diffractive section should be close to each other.

On the other hand, when the wavelength is shifted toward the longer wavelength side simply by an unevenness of the laser oscillating wavelength, the over spherical aberration is generated in the diffractive section, but a chromatic aberration in the diffractive section is smaller than the over spherical aberration, resulting in the over spherical aberration in the diffractive section which remains without being cancelled.

Consequently, there is a tendency that, when improving the wavelength characteristics to exceed the certain level, the temperature characteristic begins to go down, while, when improving the temperature characteristics to exceed the certain level, the wavelength characteristic begins to go down, which requires that both of them are balanced.

SUMMARY OF THE INVENTION

The invention has been achieved in view of the above-mentioned problems, and an object of the invention is, in the interchangeable objective lens which is using diffraction, to provide with an objective lens, wherein, in addition to the interchangeability between DVD and CD, temperature characteristics is considered, and an objective lens wherein wavelength characteristic is considered and an objective lens wherein these characteristics are well-balanced, and further, to provide with an optical pickup apparatus using these objective lenses.

(1) The optical pickup apparatus described in (1) is represented by an optical pickup apparatus that is provided with a first light source with wavelength $\lambda_1$ that records and/or reproduces information by radiating the light flux on the first optical information recording medium with a transparent base board having thickness $t_1$, a second light source with wavelength $\lambda_2$ ($\lambda_1<\lambda_2$) that records and/or reproduces information by radiating the light flux on the second optical information recording medium with a transparent base board having thickness $t_2$ ($t_1<t_2$), a light-converging optical system including an objective lens made of a single plastic material that converges the light fluxes radiated from the above-mentioned first and second light sources on the information recording surfaces via the transparent base boards of the above-mentioned first and second optical information recording media, and a diaphragm having the aperture size that is common to both the first and the second optical information recording media, and conducts recording and/or reproducing of information for each optical information recording medium, wherein on at least one side of the objective lens, there exists a diffractive section in which a concentric circular diffractive surface is provided in an effective diameter, and diffraction pitches become smaller gradually in the direction toward the periphery from an optical axis, but the basic aspheric surface of the diffraction is continuous at point h and diffraction pitch increases, when information is recorded on the first optical information recording medium or reproduced from it, the light flux passing through the above-mentioned diffractive section is corrected in terms of aberration to be not more than the diffraction limit in the effective aperture, when information is recorded on or reproduced from the second optical information recording medium, the light flux, passing through the area within a discontinuous section of the spherical aberration in which the step amount is in a range from 7 $\mu$m to 40 $\mu$m at the point h in the effective aperture in the above-mentioned diffractive section, in a forward optical system, is corrected in terms of the aberration to be the level of the diffraction limit or less, and further, when recording or reproducing of information is performed for the second optical information recording medium, the spherical aberration amount of the ray of light passing through the outermost section of the diaphragm is in a range from 7 $\mu$m to 40 $\mu$m, therefore, it is possible to adjust the flare amount properly by the discontinuous construction of the above-mentioned diffractive section, and in particular, to secure satisfactorily the temperature characteristics, when recording and/or reproducing of information is performed on the different optical recording media by the use of the same objective lens.

(2) The optical pickup apparatus described in (2) can secure the spot size of the light flux, because the above-mentioned point h satisfies $f_2(NA_2-0.03)$ mm$\leq$h$\leq$$f_2$($NA_2+0.03$) mm, when the focal length of the objective lens is f2 for recording/reproducing of information on the second optical information recording medium, and the necessary numerical aperture on the second optical information recording medium is $NA_2$.

That is, if the point h is equal to or greater than $f_2(NA_2-0.03)$ mm, a resolving power can be secured for the second optical information recording medium, while if the point h is less than or equal to $f_2(NA_2+0.03)$ mm, a margin for an inclination error of the second optical information recording medium can be secured.

(3) The optical pickup apparatus described in (3) can secure more satisfactorily the temperature characteristics, because quantity of the spherical aberration of the ray of light passing through the outermost section of the diaphragm is equal to or less than 34 $\mu$m, when information is recorded on the second optical information recording medium or reproduced from it.

(4) The optical pickup apparatus described in (4) can secure more satisfactorily the temperature characteristics, because the spherical aberration amount of the ray of light passing through the outermost section of the diaphragm is equal to or greater than 30 $\mu$m, when information is recorded on the second optical information recording medium or reproduced from it.

(5) The optical pickup apparatus described in (5) can secure more satisfactorily the wavelength characteristics in addition to the temperature characteristics, because in the forward optical system, there exists the discontinuous section with the step not greater than 9 $\mu$m at the point h in the effective aperture of the diffractive section, when information is recorded on the second optical information recording medium or reproduced from it.

(6) The optical pickup apparatus described in (6) is characterized in that, when information is recorded on the second optical information recording medium or reproduced from it, the spherical aberration changes monotonously from the discontinuous section of the spherical aberration to the outermost section of the diaphragm.

(7) The optical pickup apparatus described in (7) is characterized in that, when information is recorded on the first optical information recording medium or reproduced from it, necessary numerical aperture $NA_1$ of the objective lens, the thickness $t_1$ and light source wavelength $\lambda_1$ satisfy 0.57<$NA_1$<0.63, 0.55 mm<$t_1$<0.65 mm and 640 nm<$\lambda_1$<670 nm, respectively, and when information is recorded on the second optical information recording medium or reproduced from it, necessary numerical aperture $NA_2$ of the objective lens, the base board thickness $t_2$ and light source wavelength $\lambda_2$ satisfy 0.44<$NA_2$<0.48, 1.15 mm<$t_2$<1.25 mm and 770 nm<$\lambda_2$<795 nm, respectively.

(8) The optical pickup apparatus described in (8) is represented by an optical pickup apparatus that is provided with a first light source with wavelength $\lambda_1$ that records and/or reproduces information by radiating the light flux on the first optical information recording medium with a transparent base board having thickness $t_1$, a second light source with wavelength $\lambda_2$ ($\lambda_1<\lambda_2$) that records and/or reproduces information by radiating the light flux on the second optical information recording medium with a transparent base board having thickness $t_2$ ($t_1<t_2$), a light-converging optical system including an objective lens made of a single plastic material that converges the light fluxes radiated from the above-mentioned first and second light sources on the information recording surfaces via the transparent base boards of the above-mentioned first and second optical information recording media, and a diaphragm having the aperture size that is common to both the first and the second optical information recording media, and conducts recording and/or reproducing of information for each optical information recording medium, wherein on at least one side of the objective lens, there exists a diffractive section in which a concentric circular diffractive surface is provided in an effective diameter, and diffraction pitches become smaller gradually in the direction toward the periphery from an optical axis, but it increases at point h, when information is recorded on or reproduced from the first optical information recording medium, the light flux passing through the above-mentioned diffractive section is corrected in terms of aberration to be not more than the diffraction limit in the effective aperture, in a forward optical system, when information is recorded on the second optical information recording medium or reproducing from it, the light flux passing through the point h in the effective aperture in the above-mentioned diffractive section has the discontinuous section of the spherical aberration, and further the basic aspheric surface of the diffraction at the discontinuous section is discontinuous, therefore, it is possible to adjust the flare amount properly by the discontinuous construction of the above-mentioned diffractive section and the basic aspherical surface, and in particular, to secure satisfactorily the wavelength characteristics, when recording and/or reproducing of information is performed on the different optical recording media by the use of the same objective lens.

(9) The optical pickup apparatus described in (9) is characterized in that the above-mentioned point h satisfies $f_2(NA_2-0.03)$ mm $\leq h \leq f_2(NA_2+0.03)$ mm, when $f_2$ represents the focal length of the objective lens for recording or reproducing information for the second optical information recording medium, and $NA_2$ represents the necessary numerical aperture on the second optical information recording medium.

(10) The optical pickup apparatus described in (10) can secure more satisfactorily the wavelength characteristics, because the discontinuous amount of the basic aspheric surface of diffraction is not less than 1 $\mu$m and not greater than 10 $\mu$m.

(11) The optical pickup apparatus described in (11) can secure more satisfactorily the wavelength characteristics, because the step amount of the discontinuous section of the spherical aberration is not less than 8 $\mu$m and not greater than 16 $\mu$m.

(12) The optical pickup apparatus described in (12) is characterized in that, when information is recorded on the first optical information recording medium or reproduced from it, necessary numerical aperture $NA_1$ of the objective lens, the thickness t and light source wavelength $\lambda_1$ satisfy $0.57<NA_1<0.63$, $0.55$ mm$<t_1<0.65$ mm and $640$ nm$<\lambda_1<670$ nm, respectively, and when information is recorded on the second optical information recording medium or reproduced from it, necessary numerical aperture $NA_2$ of the objective lens, the base board thickness $t_2$ and light source wavelength $\lambda_2$ satisfy $0.44<NA_2<0.48$, $1.15$ mm$<t_2<1.25$ mm and $770$ nm$<\lambda_2<795$ nm, respectively.

(13) The optical pickup apparatus described in (13) is represented by an optical pickup apparatus having therein a light source and a light-converging optical system including an objective lens used for information recording/reproducing for the optical information recording medium, wherein a concentric circular diffractive section is formed on at least one side of the objective lens, and the pitch of the diffractive section becomes gradually narrower monotonously from an optical axis to certain point h, then the pitch of the diffraction increases at both sides of the certain point h, still further, the pitch of the diffraction monotonously decreases in the direction from the point h to the periphery, and the amount of the step in the direction of the depth of the diffractive section at the certain point h is not less than 1 $\mu$m and not greater than 10 $\mu$m in the direction where the thickness of the outer side of the lens becomes thinner than that of the inner side, and therefore, when information of recording and/or reproducing is performed for the optical information recording medium by the use of the same objective lens, the flare amount can be properly adjusted by the discontinuous construction of the diffractive section, resulting in the compatibility for the wavelength characteristics and the temperature characteristics.

(14) The objective lens described in (14) is represented by an objective lens that is used for an optical pickup apparatus that is provided with a first light source with wavelength $\lambda_1$ that records and/or reproduces information by radiating the light flux on the first optical information recording medium with a transparent base board having thickness $t_1$, a second light source with wavelength $\lambda_2$ ($\lambda_1<\lambda_2$) that records and/or reproduces information by radiating the light flux on the second optical information recording medium with a transparent base board having thickness $t_2$ ($t_1<t_2$), a light-converging optical system including an objective lens made of a single plastic material that converges the light fluxes radiated from the above-mentioned first and second light sources on the information recording surfaces via the transparent base boards of the above-mentioned first and second optical information recording media, and a diaphragm having the aperture size that is common to both the first and the second optical information recording media, and conducts recording and/or reproducing of information for each optical information recording medium, wherein on at least one side of the objective lens, there exists a diffractive section in which a concentric circular diffractive surface is provided in an effective diameter, and diffraction pitches become smaller gradually in the direction toward the periphery from an optical axis, but the basic aspheric surface of the diffraction is continuous at point h and diffraction pitch increases, when information is recorded on the first optical information recording medium or reproduced from it, the light flux passing through the above-mentioned diffractive section is corrected in terms of aberration to be not more than the diffraction limit in the effective aperture, when information is recorded on or reproduced from the second optical information recording medium, the light flux, passing through the area within a discontinuous section of the spherical aberration in which the step amount is in a range from 7 $\mu$m to 40 $\mu$m at the point h in the effective aperture in the above-mentioned diffractive section, in a forward optical system, is corrected in terms of the aberration to be the level of the diffraction limit or less, and further, when recording or reproducing of information is performed for the second optical information recording medium, the spherical aberration amount of the ray of light passing through the outermost section of the diaphragm is in a range from 7 $\mu$m to 40 $\mu$m, therefore, it is possible to adjust the flare amount properly by the discontinuous construction of the above-mentioned diffractive section, and in particular, to secure satisfactorily the temperature characteristics, when recording and/or reproducing of information is performed on the different optical recording media by the use of the same objective lens.

(15) The objective lens described in (15) is characterized in that the above-mentioned point h satisfies $f_2(NA_2-0.03)$ mm $\leq h \leq f_2(NA_2+0.03)$ mm, when the focal length of the objective lens is f2 for recording/reproducing of information on the second optical information recording medium, and the necessary numerical aperture on the second optical information recording medium is $NA_2$.

(16) The objective lens described in (16) is characterized in that, when recording or reproducing of information is performed on the above-mentioned second optical information recording medium, the spherical aberration amount of the ray of light passing through the outermost section of the above-mentioned diaphragm is not more than 34 μm.

(17) The objective lens described in (17) is characterized in that the spherical aberration amount of the ray of light passing through the outermost section of the diaphragm is equal to or greater than 30 μm, when information is recorded on the second optical information recording medium or reproduced from it.

(18) The objective lens described in (18) is characterized in that, in the forward optical system, there exists the discontinuous section with the step not greater than 9 μm at the point h in the effective aperture of the diffractive section, when information is recorded on the second optical information recording medium or reproduced from it.

(19) The objective lens described in (19) is characterized in that, when information is recorded on the second optical information recording medium or reproduced from it, the spherical aberration changes monotonously from the discontinuous section of the spherical aberration to the outermost section of the diaphragm.

(20) The objective lens described in (20) is characterized in that, when information is recorded on the first optical information recording medium or reproduced from it, necessary numerical aperture $NA_1$ of the objective lens, the thickness $t_1$ and light source wavelength $\lambda_1$ satisfy $0.57<NA_1<0.63$, 0.55 mm$<t_1<$0.65 mm and 640 nm$<\lambda_1<$670 nm, respectively, and when information is recorded on the second optical information recording medium or reproduced from it, necessary numerical aperture $NA_2$ of the objective lens, the base board thickness $t_2$ and light source wavelength $\lambda_2$ satisfy $0.44<NA_2<0.48$, 1.15 mm$<t_2<$1.25 mm and 770 nm$<\lambda_2<$795 nm, respectively.

(21) The objective lens described in (21) is represented by an objective lens that is used for the optical pickup apparatus that is provided with a first light source with wavelength $\lambda_1$, that records and/or reproduces information by radiating the light flux on the first optical information recording medium with a transparent base board having thickness $t_1$, a second light source with wavelength $\lambda_2$ ($\lambda_1<\lambda_2$) that records and/or reproduces information by radiating the light flux on the second optical information recording medium with a transparent base board having thickness $t_2$ ($t_1<t_2$), a light-converging optical system including an objective lens made of a single plastic material that converges the light fluxes radiated from the above-mentioned first and second light sources on the information recording surfaces via the transparent base boards of the above-mentioned first and second optical information recording media, and a diaphragm having the aperture size that is common to both the first and the second optical information recording media, and conducts recording and/or reproducing of information for each optical information recording medium, wherein on at least one side of the objective lens, there exists a diffractive section in which a concentric circular diffractive surface is provided in an effective diameter, and diffraction pitches become smaller gradually in the direction toward the periphery from an optical axis, but it increases at point h, when information is recorded on or reproduced from the first optical information recording medium, the light flux passing through the above-mentioned diffractive section is corrected in terms of aberration to be not more than the diffraction limit in the effective aperture, in a forward optical system, when information is recorded on the second optical information recording medium or reproducing from it, the light flux passing through the point h in the effective aperture in the above-mentioned diffractive section has the discontinuous section of the spherical aberration, and further the basic aspheric surface of the diffraction at the discontinuous section is discontinuous, therefore, it is possible to adjust the flare amount properly by the discontinuous construction of the above-mentioned diffractive section and the basic aspherical surface, and in particular, to secure satisfactorily the wavelength characteristics, when recording and/or reproducing of information is performed on the different optical recording media by the use of the same objective lens.

(22) The objective lens described in (22) is characterized in that the above-mentioned point h satisfies $f_2(NA_2-0.03)$ mm$\leq h \leq f_2(NA_2+0.03)$ mm, when the focal length of the objective lens is f2 for recording/reproducing of information on the second optical information recording medium, and the necessary numerical aperture on the second optical information recording medium is $NA_2$.

(23) The objective lens described in (23) is characterized in that the discontinuous amount of the basic aspheric surface of diffraction is not less than 1 μm and not greater than 10 μm.

(24) The objective lens described in (24) is characterized in that the step amount of the discontinuous section of the spherical aberration is not less than 8 μm and not greater than 16 μm.

(25) The objective lens described in (25) is characterized in that, when information is recorded on the first optical information recording medium or reproduced from it, necessary numerical aperture $NA_1$ of the objective lens, the thickness $t_1$ and light source wavelength $\lambda_1$ satisfy $0.57<NA_1<0.63$, 0.55 mm$<t_1<$0.65 mm and 640 nm$<\lambda_1<$670 nm, respectively, and when information is recorded on the second optical information recording medium or reproduced from it, necessary numerical aperture $NA_2$ of the objective lens, the base board thickness $t_2$ and light source wavelength $\lambda_2$ satisfy $0.44<NA_2<0.48$, 1.15 mm$<t_2<$1.25 mm and 770 nm$<\lambda_2<$795 nm, respectively.

(26) The objective lens described in (26) is represented by an objective lens that is used for recording/reproducing of information for the optical information recording medium, wherein a concentric circular diffractive section is formed on at least one side of the objective lens, and the pitch of the diffractive section becomes gradually narrower monotonously from an optical axis to certain point h, then the pitch of the diffraction increases at both sides of the certain point h, still further, the pitch of the diffraction monotonously decreases in the direction from the point h to the periphery, and the amount of the step in the direction of the depth of the diffractive section at the certain point h is not less than 1 μm and not greater than 10 μm in the direction where the thickness of the outer side of the lens becomes thinner than that of the inner side, and therefore, when information of recording and/or reproducing is performed for the optical information recording medium by the use of the same objective lens, the flare amount can be properly adjusted by the discontinuous construction of the diffractive section, resulting in the consistency between the wavelength characteristics and the temperature characteristics.

(27) The optical pickup apparatus described in (27) is represented by an optical pickup apparatus for conducting recording and or reproducing information of a first optical information recording medium equipped with a first transparent plate having a thickness of $t_1$ or a second optical information recording medium equipped with a second transparent plate having a thickness of $t_2$ ($t_1<t_2$), comprising:

a first light source to emit a first light flux having a wavelength of $\lambda_1$ to the first optical information recording medium so as to conduct recording and/or reproducing information of the first optical information recording medium;

a second light source to emit a second light flux having a wavelength of $\lambda_2$ ($\lambda_1<\lambda_2$) to the second optical information recording medium so as to conduct recording and/or reproducing information of the second optical information recording medium;

a converging optical system including a single objective lens made of a plastic material and converging the first light flux onto a recording surface of the first optical information recording medium or the second light flux onto a recording surface of the second optical information recording medium through the respective transparent plate; and a diaphragm having an aperture used for both of the first and second optical information recording medium;

wherein a diffractive section including a plurality of ring-shaped zones is provided on at least one side surface of the objective lens within an effective diameter of the one side surface, the pitch of the plurality of ring-shaped zones becomes gradually small from the optical axis to a point h within the effective diameter and the pitch increases at the point h;

wherein at the time of conducting recording or reproducing information of the first optical information recording medium, an aberration of the first light flux having passed through the diffractive section is corrected lower than a diffraction limit;

wherein in a forward optical system from the second light source to the recording surface of the second information recording medium at the time of conducting recording or reproducing information of the second optical information recording medium, the second light flux has a spherical aberration discontinuous portion at the point h where a spherical aberration-stepped amount is 10 μm to 30 μm, an aberration of a partial light flux of the second light flux having passed through an inner part of the diffractive section within the point h is corrected lower than a diffraction limit, and a spherical aberration of a light ray of the second light flux having passed through the outermost portion of the aperture of the diaphragm is 40 μm to 70 μm, and wherein the following conditional formula is satisfied:

$$0.58<NA_1<0.62 \text{ and } 0.48<NA_2<0.56$$

where $NA_1$ is a necessary numerical aperture for the first optical information recording medium and $NA_2$ is a necessary numerical aperture for the second optical information recording medium.

(28) The optical pickup apparatus described in (28) is characterized in that the diffractive section of the objective lens has a basic aspheric surface which has a discontinuous portion at the point h and a stepped length of the discontinuous portion is 1 μm to 10 μm.

(29) The optical pickup apparatus described in (29) is represented by an optical pickup apparatus for conducting recording and or reproducing information of a first optical information recording medium equipped with a first transparent plate having a thickness of $t_1$ or a second optical information recording medium equipped with a second transparent plate having a thickness of $t_2$ ($t_1<t_2$) comprising:

a first light source to emit a first light flux having a wavelength of $\lambda_1$ to the first optical information recording medium so as to conduct recording and/or reproducing information of the first optical information recording medium;

a second light source to emit a second light flux having a wavelength of $\lambda_2$ ($\lambda_1<\lambda_2$) to the second optical information recording medium so as to conduct recording and/or reproducing information of the second optical information recording medium;

a converging optical system including a single objective lens made of a plastic material and converging the first light flux onto a recording surface of the first optical information recording medium or the second light flux onto a recording surface of the second optical information recording medium through the respective transparent plate; and a diaphragm having an aperture used for both of the first and second optical information recording medium;

wherein a diffractive section including a plurality of ring-shaped zones is provided on at least one side surface of the objective lens within an effective diameter of the one side surface, the pitch of the plurality of ring-shaped zones becomes gradually small from the optical axis to a point h within the effective diameter and the pitch increases at the point h;

wherein at the time of conducting recording or reproducing information of the first optical information recording medium, an aberration of the first light flux having passed through the diffractive section is corrected lower than a diffraction limit;

wherein in a forward optical system from the second light source to the recording surface of the second information recording medium at the time of conducting recording or reproducing information of the second optical information recording medium, the second light flux has a spherical aberration discontinuous portion at the point h where a spherical aberration-stepped amount is 10 μm to 30 μm, an aberration of a partial light flux of the second light flux having passed through an inner part of the diffractive section within the point h is corrected lower than a diffraction limit, and a spherical aberration of a light ray of the second light flux having passed through the outermost portion of the aperture of the diaphragm is 50 μm to 100 μm, and wherein the following conditional formula is satisfied:

$$0.62<NA_1<0.68 \text{ and } 0.48<NA_2<0.56$$

where $NA_1$ is a necessary numerical aperture for the first optical information recording medium and $NA_2$ is a necessary numerical aperture for the second optical information recording medium.

(30) The optical pickup apparatus described in (30) is characterized in that the diffractive section of the objective lens has a basic aspheric surface which has a discontinuous portion at the point h and a stepped length of the discontinuous portion is 1 μm to 20 μm.

(31) The objective lens described in (31) is characterized by an objective lens for use in an optical pickup apparatus for conducting recording and or reproducing information of a first optical information recording medium equipped with a first transparent plate having a thickness of $t_1$ or a second optical information recording medium equipped with a second transparent plate having a thickness of $t_2$ ($t_1 < t_2$)

the optical pickup apparatus is provided with a first light source to emit a first light flux having a wavelength of $\lambda_1$ to the first optical information recording medium so as to conduct recording and/or reproducing information of the first optical information recording medium;

a second light source to emit a second light flux having a wavelength of $\lambda_2$ ($\lambda_1 < \lambda_2$) to the second optical information recording medium so as to conduct recording and/or reproducing information of the second optical information recording medium;

a converging optical system including the objective lens being a single objective lens made of a plastic material and converging the first light flux onto a recording surface of the first optical information recording medium or the second light flux onto a recording surface of the second optical information recording medium through the respective transparent plate; and a diaphragm having an aperture used for both of the first and second optical information recording medium;

the objective lens, comprising:

a diffractive section including a plurality of ring-shaped zones provided on at least one side surface of the objective lens within an effective diameter of the one side surface, wherein the pitch of the plurality of ring-shaped zones becomes gradually small from the optical axis to a point h within the effective diameter and the pitch increases at the point h;

wherein at the time of conducting recording or reproducing information of the first optical information recording medium, an aberration of the first light flux having passed through the diffractive section is corrected lower than a diffraction limit;

wherein in a forward optical system from the second light source to the recording surface of the second information recording medium at the time of conducting recording or reproducing information of the second optical information recording medium, the second light flux has a spherical aberration discontinuous portion at the point h where a spherical aberration-stepped amount is 10 μm to 30 μm, an aberration of a partial light flux of the second light flux having passed through an inner part of the diffractive section within the point h is corrected lower than a diffraction limit, and a spherical aberration of a light ray of the second light flux having passed through the outermost portion of the aperture of the diaphragm is 40 μm to 70 μm, and wherein the following conditional formula is satisfied:

$0.58 < NA_1 < 0.62$ and $0.48 < NA_2 < 0.56$ where $NA_1$ is a necessary numerical aperture for the first optical information recording medium and $NA_2$ is a necessary numerical aperture for the second optical information recording medium.

(32) The objective lens described in (32) is characterized in that the diffractive section of the objective lens has a basic aspheric surface which has a discontinuous portion at the point h and a stepped length of the discontinuous portion is 1 μm to 10 μm.

(33) The objective lens described in (33) is characterized by an objective lens for use in an optical pickup apparatus for conducting recording and or reproducing information of a first optical information recording medium equipped with a first transparent plate having a thickness of $t_1$ or a second optical information recording medium equipped with a second transparent plate having a thickness of $t_2$ ($t_1 < t_2$), the optical pickup apparatus is provided with a first light source to emit a first light flux having a wavelength of $\lambda_1$ to the first optical information recording medium so as to conduct recording and/or reproducing information of the first optical information recording medium;

a second light source to emit a second light flux having a wavelength of $\lambda_2$ ($\lambda_1 < \lambda_2$) to the second optical information recording medium so as to conduct recording and/or reproducing information of the second optical information recording medium;

a converging optical system including the objective lens being a single objective lens made of a plastic material and converging the first light flux onto a recording surface of the first optical information recording medium or the second light flux onto a recording surface of the second optical information recording medium through the respective transparent plate; and a diaphragm having an aperture used for both of the first and second optical information recording medium;

the objective lens, comprising:

a diffractive section including a plurality of ring-shaped zones provided on at least one side surface of the objective lens within an effective diameter of the one side surface, wherein the pitch of the plurality of ring-shaped zones becomes gradually small from the optical axis to a point h within the effective diameter and the pitch increases at the point h;

wherein at the time of conducting recording or reproducing information of the first optical information recording medium, an aberration of the first light flux having passed through the diffractive section is corrected lower than a diffraction limit;

wherein in a forward optical system from the second light source to the recording surface of the second information recording medium at the time of conducting recording or reproducing information of the second optical information recording medium, the second light flux has a spherical aberration discontinuous portion at the point h where a spherical aberration-stepped amount is 10 μm to 30 μm, an aberration of a partial light flux of the second light flux having passed through an inner part of the diffractive section within the point h is corrected lower than a diffraction limit, and a spherical aberration of a light ray of the second light flux having passed through the outermost portion of the aperture of the diaphragm is 50 μm to 100 μm, and wherein the following conditional formula is satisfied:

$0.62 \leq NA_1 < 0.68$ and $0.48 < NA_2 < 0.56$ where $NA_1$ is a necessary numerical aperture for the first optical information recording medium and $NA_2$ is a necessary numerical aperture for the second optical information recording medium.

The objective lens described in (31) is characterized in that the diffractive section of the objective lens has a basic aspheric surface which has a discontinuous portion at the point h and a stepped length of the discontinuous portion is 1 μm to 20 μm.

The diffractive section described in this specification means a section where, function to converge or to diverge the light flux by diffraction is provided, by making relief on the surface of the lens. As a form of the relief, there is known a form that is formed on the lens surface as a concentric ring-shaped zone whose center is an optical axis, which looks like a saw-tooth when its section is viewed in a plane including the optical axis.

The objective lens described in this specification means, in a narrow sense, a lens which is arranged to be closest to the optical information recording medium side to face it under the condition that an optical information recording medium is loaded in an optical pickup apparatus, and has a light-converging function, and also means, in a broad sense, a group of lenses which can be moved together with the lens by an actuator in at least the optical axis direction. Herein, the group of the lenses means at least one or more lenses (for example, two lenses)

Accordingly, in this specification, numerical aperture NA of the objective lens closer to the optical information recording medium side (image side) means numerical aperture NA of the lens surface of the objective lens closest to the optical information recording medium.

Further, in this specification, the necessary numerical number NA means a numerical aperture that is prescribed by the specification of each optical information recording medium, or means a numerical aperture of the objective lens having a diffraction marginal power that can obtain a necessary spot diameter for recording or reproducing information, in accordance with the wavelength of the light source in use, for each optical information recording medium.

Further, in the present invention, the definition of the single lens includes a jointed lens in which for example, two lenses are jointed in a single body.

In this specification, the second optical information recording medium means, for example, optical discs of various CDs group such as CD-R, CD-RW, CD-Video and CD-ROM, while the first optical information recording medium means, optical discs of various DVDS group such as DVD-ROM, DVD-RAM, IDVD-R, DVD-RW and DVD-Video.

Moreover, in this specification, the thickness t of the transparent base board includes the case of t=0.

DETAILED DESCRIPTION OF THE PREFERRED EMBODIMENT

Figure 1:
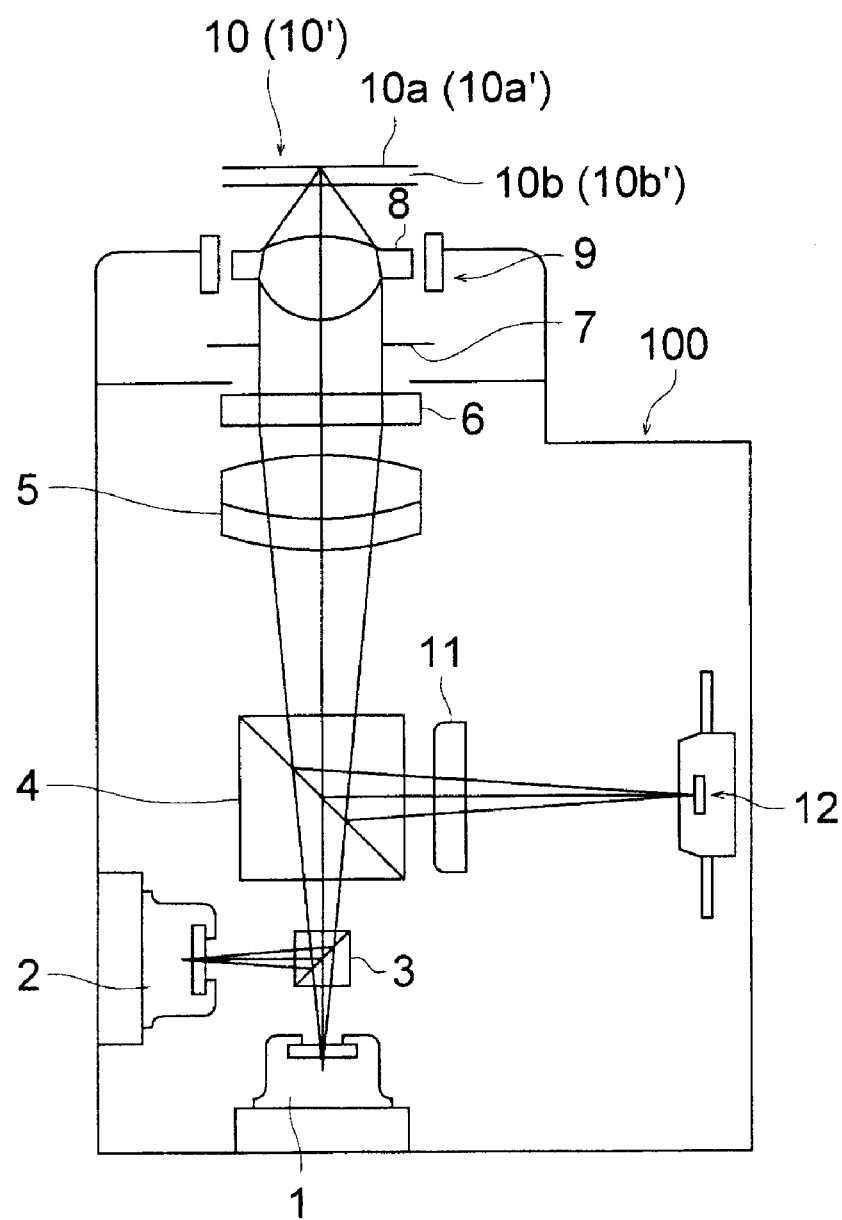
FIG. 1 is a schematic structural drawing showing an optical pickup apparatus including an objective lens in the present embodiment.

The invention will be explained more particularly referring to the drawings.

(The First Embodiment)

The first embodiment will be explained. FIG. 1 is a schematic structural drawing showing an optical pickup apparatus including an objective lens of the present embodiment. In the present embodiment, there will be explained the objective lens that is used in the optical pickup apparatus that conducts recording and/or reproducing of information for both the first information recording medium 10 (hereafter referred to as DVD) having the transparent base board thickness $t_1$ and the second information recording medium 10' (hereinafter referred to as CD) having the transparent base board thickness $t_2$. Here, the thickness of the transparent base boards represents respectively $t_1$=0.6 mm, and $t_2$=1.2 mm, and the necessary numerical aperture of the objective lens is $NA_1$=0.60 for DVD, and $NA_2$=0.45 for CD, respectively.

For the light source, the optical pickup apparatus is provided with first semiconductor laser 1(wavelength $\lambda_1$=610 nm–670 nm) as the first light source for DVD 10 and the second semiconductor laser 2 (wavelength $\lambda_2$=740 nm–870 nm) as the second light source of CD10'. The first semiconductor laser 1 and the second semiconductor laser 2 are used selectively depending on the optical information recording media 10 and 10' to record and/or reproduce information. Further compounding means 3 is means that can compound the light flux radiated from the first semiconductor laser 1 and the light flux radiated from the second semiconductor laser 2.

Firstly, when DVD 10 having transparent base board thickness $t_1$ is reproduced, a light flux is radiated from the first semiconductor 1, and the radiated light flux passes through compounding means 3, polarized light flux splitter 4, collimator lens 5 and quarter wavelength plate 6 to turn out to be a collimated light flux of circularly polarized light. This light flux is stopped down by diaphragm 7, and converged on information recording surface 10a by objective lens 8 via transparent base board 10b of DVD 10. The light flux that is modulated by information pit of information recording surface 10a and reflected passes again through objective lens 8, quarter wavelength plate 6 and collimator lens 5 and enters polarized light splitter 4, where the light flux is reflected, and is given astigmatism by cylindrical lens 11 to enter optical detector 12 representing the light receiving element. Thus, the read-out signal of information recorded on DVD 10 is obtained by the signal outputted from optical detector 12.

By detecting the change of the quantity of light distribution caused by the change of a form of the spot on optical detector 12, a focusing detection and a track detection are conducted. Based on these detections, two-dimensional actuator 9 moves objective lens 8 so that the light from the first semiconductor laser 1 may form an image on information recording surface 10a of DVD 10, and also moves objective lens 8 so that the light from the first semiconductor laser 1 may form an image on the prescribed track.

On the other hand, when CD10' representing the transparent base board of the thickness $t_2$ ($t_1 < t_2$) is reproduced, a light flux is radiated from the second semiconductor laser 2, and the radiated light flux is changed in terms of its optical path by compounding means 3, and converged on information recording surface 10a' after passing through polarized light flux splitter 4, collimator lens 5, quarter wavelength plate 6, diaphragm 7 having the common aperture size to the first optical information recording medium (DVD) 10 and objective lens 8, via transparent base board 10b' of CD10'. The light flux that is modulated by information pit of information recording surface 10a' and reflected enters optical detector 12 again via objective lens 8, quarter wavelength plate 6, collimator lens 5, polarized light flux splitter 4 and cylindrical lens 11. Thus, the read-out signal of information recorded on CD10' is obtained by the signal outputted from optical detector 12.

By detecting the change of the quantity of light distribution caused by the change of a form of the spot on optical detector 12, a focusing detection and a track detection are conducted. Based on these detections, two-dimensional actuator 9 moves objective lens 8 so that the light emitted from the second semiconductor laser 2 may form an image on information recording surface 10a' of CD 10', and also moves objective lens 8 so that the light emitted from the second semiconductor laser 2 may form an image on the prescribed track 8. Incidentally, nearly the same action is performed, when recording information on optical information recording media 10 and 10' in addition to reproducing.

The objective lens 8 in the present embodiment converges the light flux emitted from each of the semiconductor lasers 1 and 2 on each of information recording surfaces 10a and 10a' of each of the optical information recording media 10 and 10' via diaphragm 7 whose aperture size is common to DVD and CD as mentioned above.

Figure 2:
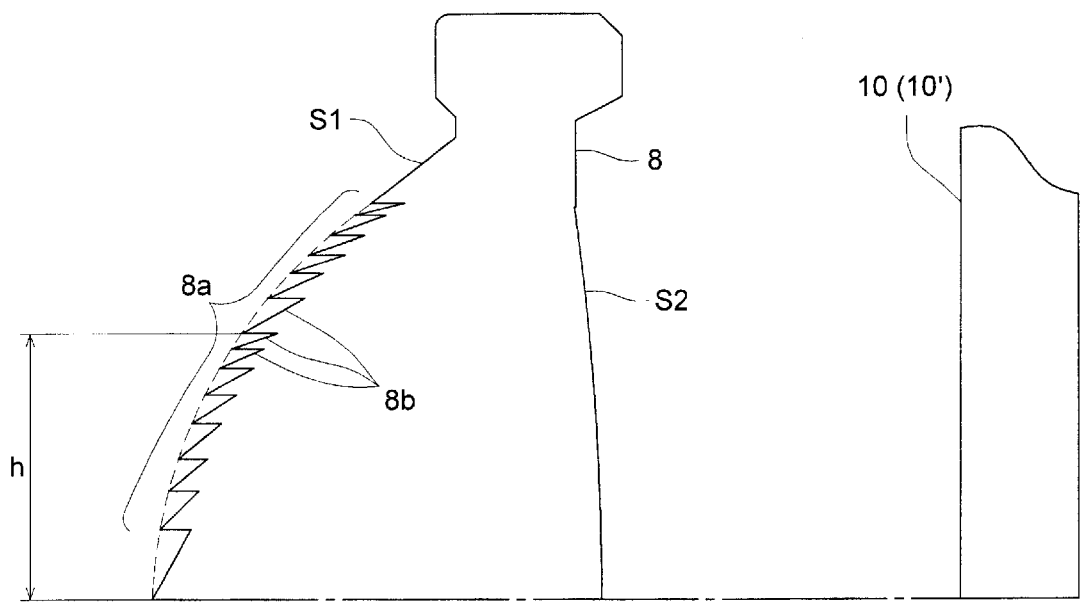
FIG. 2 is a section showing illustratively an objective lens in the first Embodiment.

FIG. 2 is a section showing illustratively the objective lens of the present embodiment. A one-dot chain line shows an optical axis. Surface S1 of objective lens 8 closer to the light source is constructed with diffractive surface 8b that is concentric circular around an optical axis. Further, refractive surface S2 closer to the optical information recording medium has an aspheric shape, and it is a lens having positive power totally. The pitch of diffractive section 8a decreases monotonously from the optical axis to certain point h, and the pitch of the diffractive surface 8b increases temporarily on both sides of the certain point h. Further, it further decreases from the certain point h to the periphery.

Furthermore, since there is a difference between DVD and CD about the necessary numerical aperture of objective lens 8, when diaphragm 7 having the common aperture size is used as mentioned above, it is necessary to design the exclusive region and the common region from the different view points.

Figure 3:
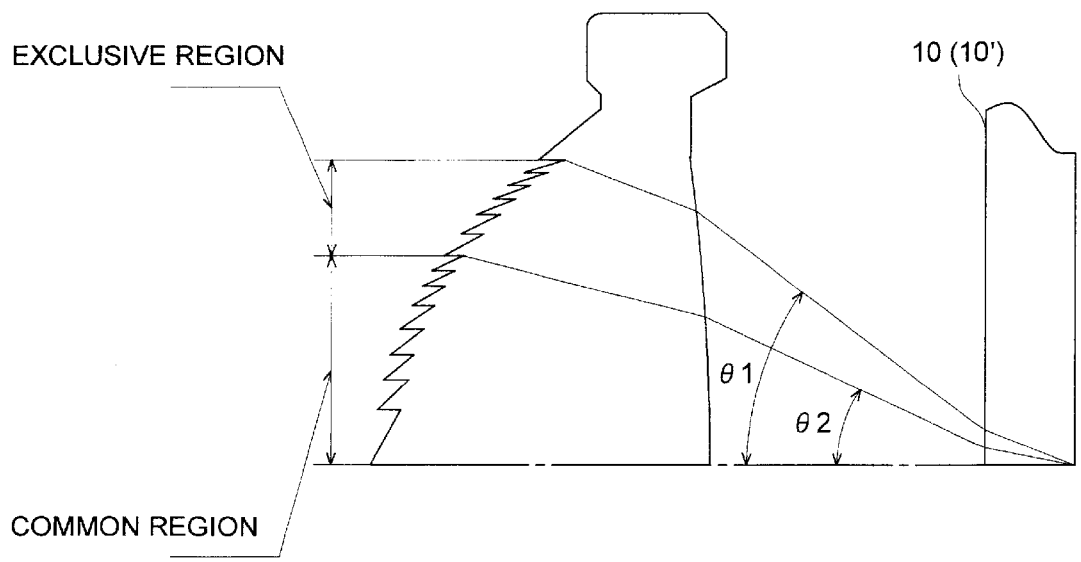
FIG. 3 is a drawing showing conception of an exclusive region and a common region.

FIG. 3 is a drawing showing the conception of the exclusive region and the common region. There exists a boundary area for the exclusive region and the common region near NA$_2$ 0.45 that is required for recording and/or reproducing information for CD, and the ray of light in the outside of the exclusive region corresponds to NA$_1$ 0.60 that is required for recording and/or reproducing information for DVD.

Approximately, NA$_1$ is equal to $\sin\theta 1$ and NA$_2$ is equal to $\sin\theta 2$. The discontinuous section of the spherical aberration mentioned in the invention corresponds to this boundary section. Further, the ray of light in the outermost section of the aperture in the diaphragm corresponds to the ray of light of NA=0.60 in case of DVD.

In the present embodiment, the correction of the total spherical aberration for the light fluxes passing through the common region and the exclusive region is conducted on DVD. While for CD, the correction of the spherical aberration of the light flux passing through the common region is conducted.

Incidentally, in the present embodiment, the basic aspheric surface of the diffractive surface is designed to be continuous in this boundary area. The basic aspheric surface will be described later.

The design that makes the basic aspheric surface to be discontinuous is explained in the second embodiment. To be not more than the diffraction limit in this specification means a case that a total wave front aberration is not more than $0.07\lambda$ rms of Maréchal's criterion. Further, "forward optical system" means a path covering from the semiconductor laser from which the light flux is radiated to the information recording surface of the optical information recording medium where the light flux is converged.

In the case of CD, as shown in FIG. 3, the light flux passing through the common region is used to form the light spot, but the light flux passing through the exclusive region is made to be the flare and is not used. However, the inventors found that it is necessary for designing to consider how to obtain the flare component in CD, when they consider the balance between wavelength characteristics and temperature characteristics in DVD. These will be explained referring to the following drawings.

FIG. 4(a) is a spherical aberration diagram at the time of conducting recording and/or reproducing information of DVD with the light flux having a wavelength $\lambda_1$ and FIG. 4(b) is a spherical aberration diagram at the time of conducting recording and/or reproducing information of CD with the light flux having a wavelength $\lambda_2$. In FIG. 4(b), x represents a spherical aberration-stepped amount (an amount of a stepped difference in spherical aberration) at a point h as recited in claim and y represents a spherical aberration (an outermost spherical aberration) of a light ray having passed through the outermost portion of the aperture of the diaphragm at the time of using CD.

FIGS. 5(a) and 5(b) indicates a result of a simulation of DVD wavelength characteristic at the time of changing a technique to form a flare at the time of using CD, and FIGS. 5(c) and 5(d) indicates a result of a simulation of DVD temperature characteristic at the time of changing a technique to form a flare at the time of using CD. In the DVD wavelength characteristic shown in FIGS. 5(a) and 5(b), the axis of ordinates indicates a variance δWF ($\lambda$ rms) of a spherical aberration component of a wavefront aberration at the time of using DVD when a wavelength change δ$\lambda$ is +10 nm (δ$\lambda$=+10 nm) and a temperature is not changed (δT=0° C.). In FIG. 5(a), the axis of abscissas indicates a spherical aberration-stepped difference x ($\mu$m) at the time of using CD, and in FIG. 5(b), the axis of abscissas indicates an outermost spherical aberration y ($\mu$m) at the time of using CD. In the DVD temperature characteristic shown in FIGS. (c) and (d), the axis of ordinates indicates a variance δWF ($\lambda$ rms) of a spherical aberration component of a wavefront aberration at the time of using DVD when a temperature change δT is +30° C. (δT=30° C.) and a wavelength change δ$\lambda$ is +6 nm (δ$\lambda$=+6 nm). In FIG. 5(c), the axis of abscissas indicates a spherical aberration-stepped difference x ($\mu$m) at the time of using CD, and in FIG. 5(d), the axis of abscissas indicates an outermost spherical aberration y ($\mu$m) at the time of using CD.

As can be seen from FIGS. 5(a) and 5(b), the greater the spherical aberration-stepped amount and the outermost spherical aberration are, the smaller the variance of the spherical aberration component of the wavefront aberration is and DVD wavelength characteristic becomes better. On the other hand, the smaller the spherical aberration-stepped amount and the outermost spherical aberration are, the smaller the variance of the spherical aberration component of the wavefront aberration is and DVD temperature characteristic becomes better. In other words, the DVD wavelength characteristic and the DVD temperature characteristic indicates a reciprocal tendency to each other for the changes of the spherical aberration-stepped amount and the outermost spherical aberration at the time of using CD. Therefore, on considering the balance between the DVD wavelength characteristic and the DVD temperature characteristic, it may be preferable that the spherical aberration-stepped amount at the time of using CD is determined at a value in the vicinity of the crossing point between approximated straight lines in FIGS. 5(a) and 5(c) and the outermost spherical aberration at the time of using CD is determined at a value in the vicinity of the crossing point between approximated straight lines in FIGS. 5(b) and 5(d).

By establishing the flare amount to be appropriate as mentioned above, it becomes possible to obtain the one wherein temperature characteristics for DVD are improved, or the one wherein the wavelength characteristics are improved, while securing the interchangeability of DVD and CD, or also possible to secure both the wavelength characteristics and the temperature characteristics for DVD.

Incidentally, the invention is not limited to this embodiment. Though there has been introduced the objective lens for the optical pickup apparatus having the necessary numerical aperture $NA_1=0.60$ for DVD, and the necessary numerical aperture $NA_2=0.45$ for CD, the common region and the exclusive region have to be designed properly also for another interchangeability. In this case also, the light spot formation of CD system uses the light flux that passes through the common region, and makes the light flux that passes through the exclusive region to be flare, but in order to secure both the temperature characteristics and the wavelength characteristics of DVD system, the flaring amount at the switching point and the flare amount of the ray of light at the most peripheral zone of the DVD need to be looked. In this case, by shifting the discontinuous amount of the spherical aberration at the switching point by design, it is possible to secure the balance between the wavelength characteristics and the temperature characteristics.

Further, though the total surfaces of the common region and the exclusive are made to be the diffractive surface that is in a form of concentric circles centered on the optical axis, a partial ring-shaped zone may be constructed with a refractive ring-shaped zone, without being limited to the foregoing.

Still further, there has been explained the example wherein the light fluxes radiated from separate semiconductor lasers for DVD and CD enter a single objective lens, however, the invention may also be applied to the light source developed recently in which two light-emitting points are made to be one chip.

(The Second Embodiment)

Next, the second embodiment will be explained. The large difference from the first embodiment is that the basic aspheric surface of the diffractive surface at the boundary section is designed to be discontinuous. Since the points other than that are the same as those mentioned above, the explanation of the overlapped points will be omitted.

Figure 7:
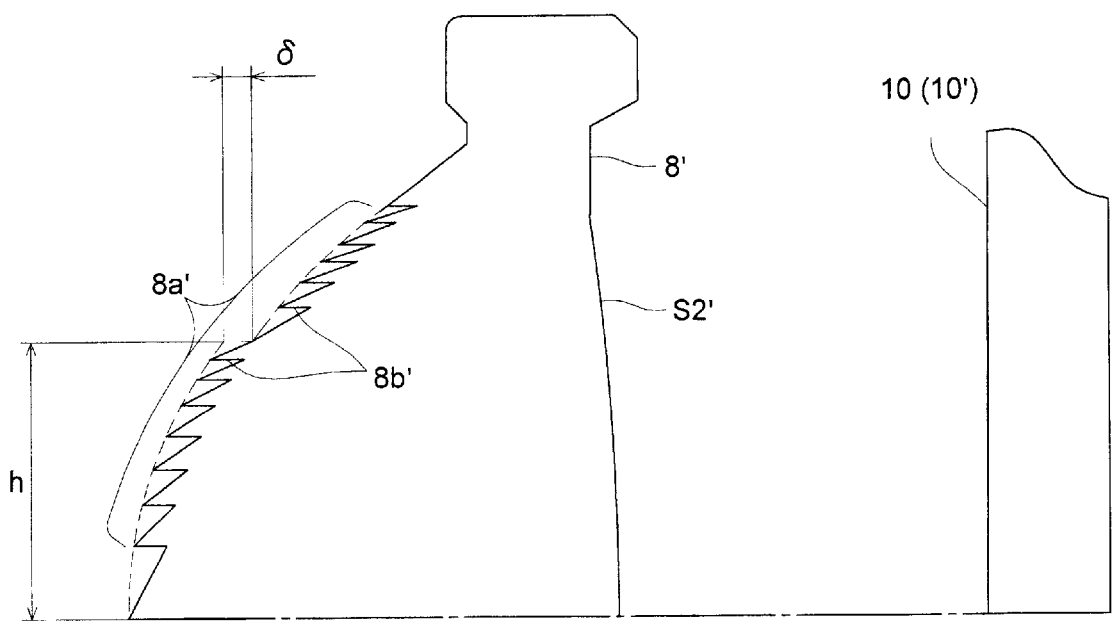
FIG. 7 is a section showing illustratively an objective lens the second Embodiment.

FIG. 7 is a section showing illustratively the objective lens of the present embodiment. The surface S1 of the objective lens 8' closer to the light source is constituted by the diffractive surface 8b' representing the concentric circles around the optical axis. Further, the refractive surface S2 closer to the optical information recording medium has a form of an aspheric surface, and it is a convex lens having a positive power as a whole. The pitch of the diffractive section 8a' decreases monotonously from the optical axis to certain point h, and the pitch increases temporarily on both sides of the certain point h. Still further, it decreases from the certain point h to the periphery. Still further, the basic aspheric surface of the diffractive surface 8b' is designed to be discontinuous at the certain point h. Additionally the step δ is provided on the outer side of the certain point h in the direction for the lens thickness to become thinner. By providing the step δ of the basic aspheric surface, it is possible to make the objective lens 8' to be stable for wavelength and temperature characteristics. The relation between the step amount of the basic aspheric surface and the changing amount of the spherical aberration is shown in the following table 4.

Since there is provided the step δ on the basic aspheric surface of the diffractive surface illustrated in FIG. 7, the step also exists on the switching section (which is at the certain point h from an optical axis) of the diffractive surface 8b'. The step was effective for the wavelength characteristics and the temperature characteristics, when it was provided in the direction where the outside became thinner in FIG. 7

In the present embodiment also, it is preferable that the certain point h is established near the necessary numerical aperture $NA_2$ of CD, because if it is established at the point higher than this, the margin to a disc tilt error becomes smaller although CD spot size becomes small. On the contrary, if the certain point h is established at the lower position, it is not preferable because of the lack of the resolving power of CD.

Furthermore, as shown in FIG. 7, the spherical aberration of the exclusive region of CD is designed to be spherical aberration shaped to be in a form of a curve convex upward. By doing this, it is possible to enhance a peak intensity of the spot light of CD.

In the present embodiment, as well as the first embodiment, needless to say, it is possible to obtain the objective lens with more preferable wavelength characteristics, the objective lens with more preferable temperature characteristics, or the objective lens with well-balanced wavelength and temperature characteristics, by controlling the step amount of the discontinuous section of the spherical aberration in information recording and/or reproducing for the second optical information recording medium (CD) 10', and the spherical aberration amount of the ray of light corresponding to $NA_1$ in information recording and/or reproducing for the second optical information recording medium 10'.

EXAMPLE

There will be explained as follows the example of the objective lens which is very suitable for the optical pickup apparatus in the present embodiment mentioned above.

Example 1

This example is the first embodiment stated above. Generally, a diffraction ring-shaped zone pitch of the diffraction surface is defined by the use of a phase difference function or an optical path difference function. Concretely, the phase difference function $\Phi_b$ is expressed by the following Formula 1 with its unit radian, while the optical path difference function $\Phi_B$ is expressed by Formula 2 with its unit mm.

$$\Phi_b = \sum_{i=0}^{\infty} b_{2i} h^{2i} \quad \text{Formula 1}$$

$$\Phi_B = \sum_{i=0}^{\infty} b_{2i} h^{2i} \quad \text{Formula 2}$$

These two formulas are different in terms of units, but they are the same in terms of meaning of expressing the pitch of the diffractive ring-shaped zone. That is, the main wavelength $\lambda$ (unit mm) can be converted to a coefficient B of the optical path difference function by multiplying a coefficient b of the phase difference function by $\lambda/2\pi$, and conversely, the main wavelength $\lambda$ (unit mm) can be converted to the coefficient b of the phase difference function by dividing the coefficient B of the optical path difference function by $\lambda/2\pi$.

Based on the above-mentioned definition, it is possible to make a lens to have a power, by making the second order coefficient of the phase difference function or the optical path difference function to be a nonzero value. When the coefficient of the phase difference function or the optical path difference function other than the 2nd-order coefficient, such as, for examples, 4th-order coefficient, 6th-order coefficient, 8th-order coefficient or 10th-order coefficient, is made to be a nonzero value, the spherical aberration can be controlled. Here, "to control" means to correct the spherical aberration totally, by making the spherical aberration of the diffractive section and the spherical aberration of the refractive section to be reverse each other, or means to change the total spherical aberration to the desired flare amount, by manipulating the spherical aberration of the diffractive section.

Further, the above-mentioned diffractive surface is formed on at least one side of the surfaces, and an aspherical surface shape expressed by the following Formula 3 exists.

$$Z = \frac{h^2/r}{1 + \sqrt{1-(1+\kappa)(h/r)^2}} + \sum_{i=1}^{\infty} A_i h^{P_i} \quad \text{Formula 3}$$

Herein, Z is an axis in the direction of the optical axis, h is an axis in the direction perpendicular to the optical axis (height from the optical axis: The light advancing direction is positive.), r is a paraxial radius of curvature, $\kappa$ is a coefficient of the cone, A is an aspherical coefficient and P is a power number of the aspheric surface.

For DVD, design basis wavelength $\lambda_1$ is equal to 655 nm, standard temperature T is equal to 25° C., focal length f is equal to 3.36 mm, numerical aperture $NA_1$ is equal to 0.60 and thickness $t_1$ of a transparent base board of an optical information recording medium is equal to 0.6 mm. Further for CD, design basis wavelength $\lambda_2$ is equal to 785 nm and thickness $t_2$ of a transparent base board of an optical information recording medium is equal to 1.2 mm.

Further, the semiconductor laser has the characteristics that the laser wavelength varies in accordance with a variation of the environmental temperature. In the example described below, the wavelength variation caused by the semiconductor laser temperature variation is set to 0.2 nm/° C. Besides, the temperature characteristics in this specification, are supposed to be under the changing condition of the environmental temperature, and they include a wavelength variation and temperature variation of the light source. Besides, the wavelength characteristics are supposed to be under the condition of no variation of the environmental temperature, and they include the influence of only the variation of the light source wavelength.

A plastic material representing the material of the objective lens belongs to an olefin type resin, and its refractive index is also varied by temperature variation, with $\delta n/\delta T$ being nearly 3×E−5.

Incidentally, hereinafter (including the lens data in tables), exponent of ten (for example, 2.5×10$^{-3}$) is expressed by using E (for example, 2.5×E−3).

Table 1 shows data of the objective lens. A symbol i shows the face number, and i=1 means diaphragm. Further, the diffractive surface is formed on the surface of the objective lens, closer to the laser side, i=2 is data in the common region, and i=2' is data in the exclusive region. Further, i=4 and i=5 mean the optical information recording media. A symbol h means the height from the optical axis, the exclusive region and the common region are indicated by the optical path function and the aspheric coefficient respectively. Still further, "a certain point h" in the present invention means the switching point of the areas, resulting h=1.5885 mm in this embodiment.

Figure 4:
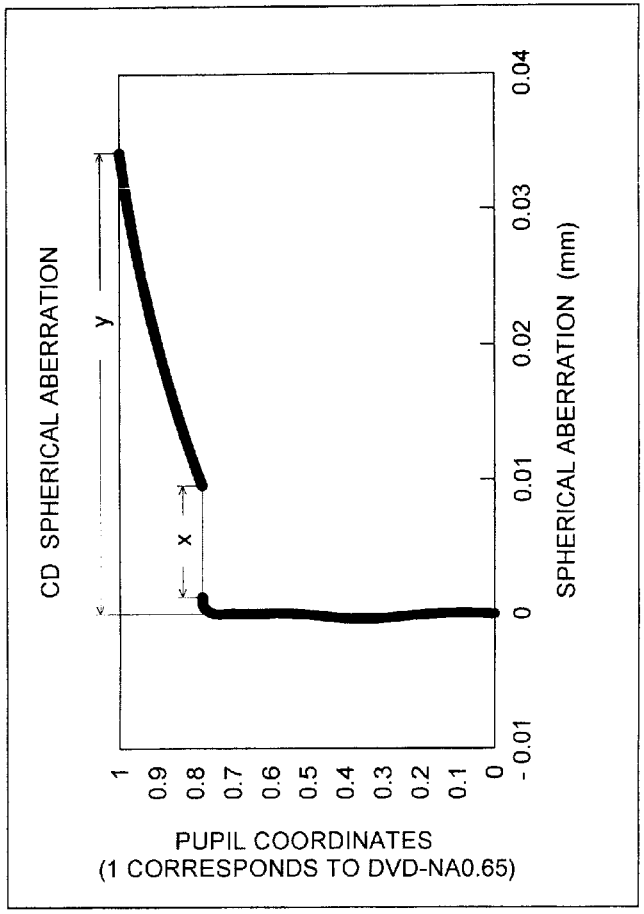
FIG. 4(a) shows a spherical aberration diagram at the tie of using DVD and FIG. 4(b) shows a spherical aberration diagram at the tie of using CD.
Figure 4:
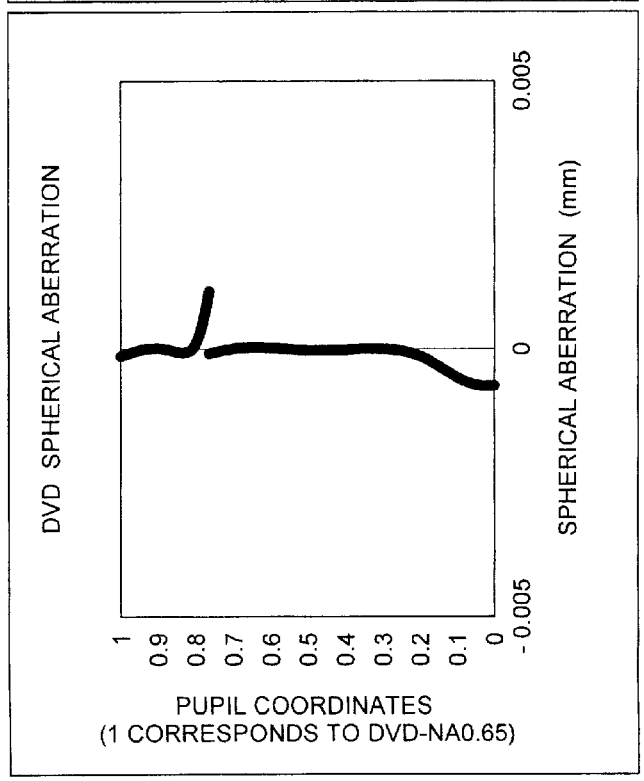

FIG. 4 shows the spherical aberration charts of DVD and CD respectively.

TABLE 1

| No.i surface | ri | di (655 nm) | ni (655 nm) | di (655 nm) | ni (655 nm) | |
|---|---|---|---|---|---|---|
| $f_1$ = 3.36 mm | | | | | | |
| 1 | ∞ | 0.0 | 1.0 | 0.0 | 1.0 | Diaphragm aperture diameter φ4.04 mm |
| 2 | 2.11407 | 2.2 | 1.54094 | 2.2 | 1.53716 | |
| 2' | 2.48705 | 2.173 | 1.54094 | 2.2 | 1.53716 | |
| 3 | −8.22482 | 1.7529 | 1.0 | 1.3879 | 1.0 | |
| 4 | ∞ | 0.6 | 1.57752 | 1.2 | 1.57063 | |
| 5 | ∞ | | | | | |

TABLE 1-continued

Aspherical data
The second surface (0 < h < 1.5885 mm:DVD/CD common region)
Aspherical coefficient

| κ  | −2.2075 × E − 0 |    |      |
|----|-----------------|----|------|
| A1 | +2.0119 × E − 2 | P1 | 4.0  |
| A2 | −7.0650 × E − 4 | P2 | 6.0  |
| A3 | −4.3563 × E − 4 | P3 | 8.0  |
| A4 | +8.8717 × E − 5 | P4 | 10.0 |

Optical path difference function
(Coefficient of the optical path difference function:
Standard wavelength 720 nm)

| B2 | −2.0188 × E − 3 |
|----|-----------------|
| B4 | +7.3880 × E − 4 |
| B6 | −3.6841 × E − 4 |
| B8 | +5.7087 × E − 5 |

The second surface (h < 1.5885 mm: DVD Exclusive region)
Aspherical coefficient

| κ  | +6.2742 × E − 2 |    |      |
|----|-----------------|----|------|
| A1 | +1.4278 × E − 2 | P1 | 4.0  |
| A2 | −6.2694 × E − 3 | P2 | 6.0  |
| A3 | +1.1432 × E − 3 | P3 | 8.0  |
| A4 | −1.4237 × E − 4 | P4 | 10.0 |

Optical path difference function
(Coefficient of the optical path difference function:
Standard wavelength 655 nm)

| B2  | +2.3672 × E − 2 |
|-----|-----------------|
| B4  | −2.2032 × E − 2 |
| B6  | +8.2055 × E − 3 |
| B8  | −1.5045 × E − 3 |
| B10 | +1.0754 × E − 4 |

The third surface
Aspherical coefficient

| κ  | +2.8703 × E − 0 |    |      |
|----|-----------------|----|------|
| A1 | +2.2701 × E − 2 | P1 | 4.0  |
| A2 | −1.2631 × E − 2 | P2 | 6.0  |
| A3 | +5.8438 × E − 3 | P3 | 8.0  |
| A4 | −1.6771 × E − 3 | P4 | 10.0 |
| A5 | +2.4271 × E − 4 | P5 | 12.0 |
| A6 | −1.2458 × E − 5 | P6 | 14.0 |

Table 2 shows the step amount of the spherical aberration and the spherical aberration amount of the ray of light corresponding to NA 1 at the switching position, and the spherical aberration variation in the cases of the temperature variation and the wavelength variation, when CD is used in this embodiment.

Figure 5:
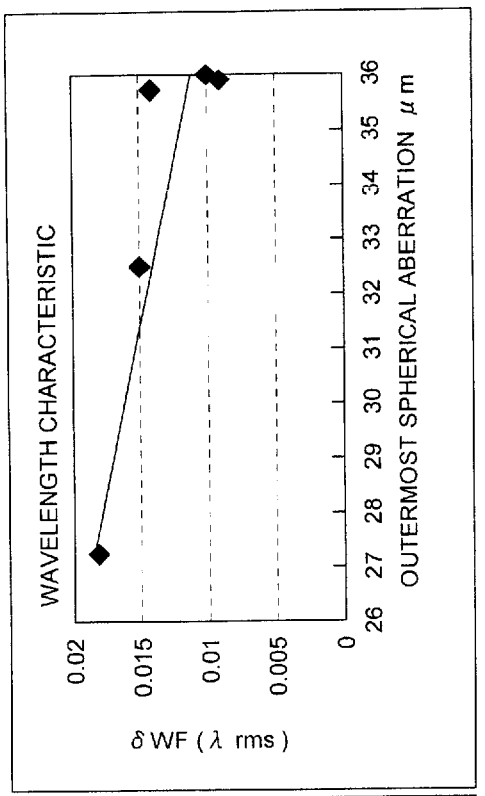
FIGS. 5(a) to 5(d) are diagrams showing DVD wavelength characteristic and DVD temperature characteristic when the methods for forming a flare are changed at the time of using CD.
Figure 5:
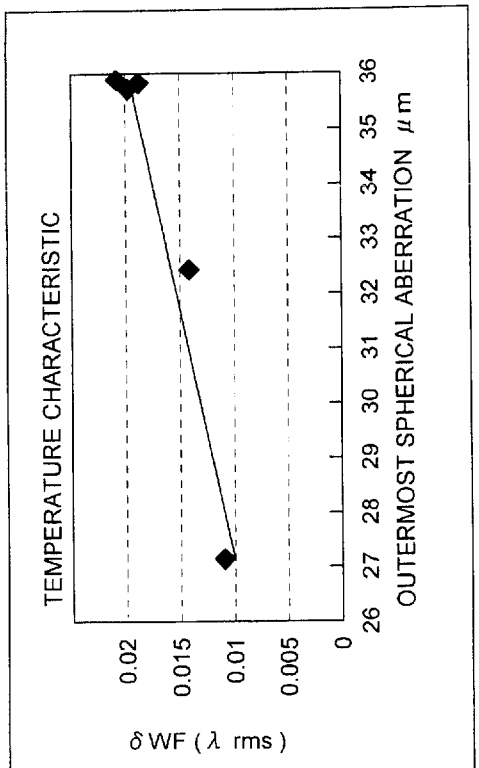
Figure 5:
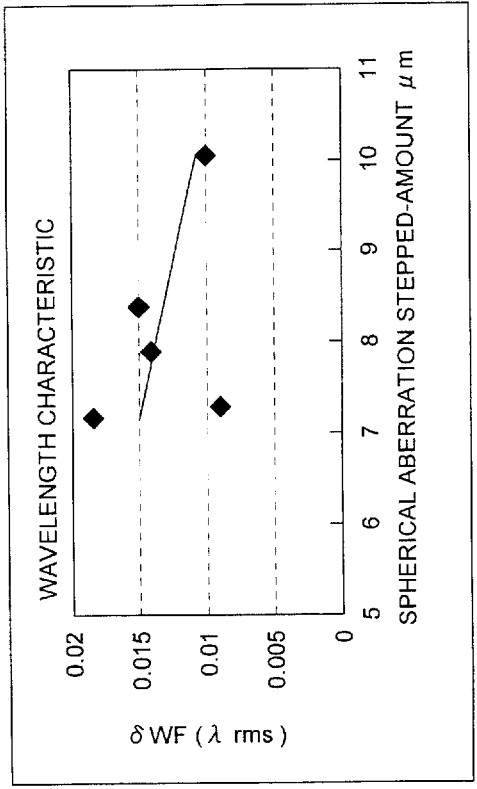
Figure 5:
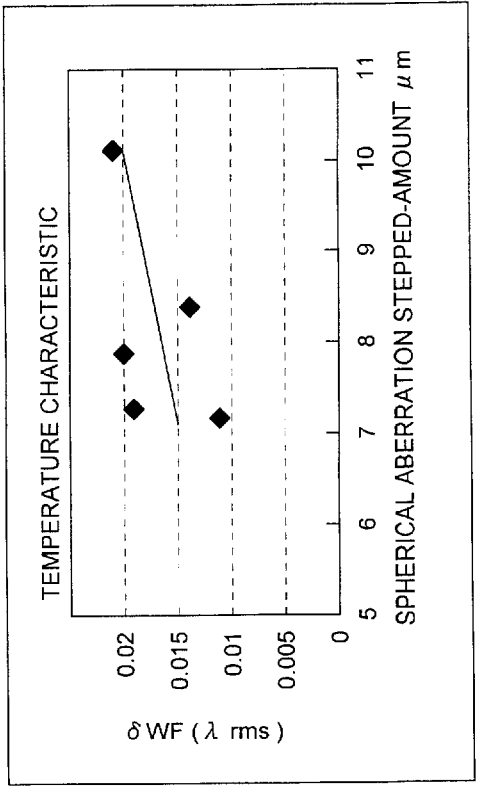

For reference, there is described each of the characteristics under the design examples shown in FIG. 5.

Figure 6:
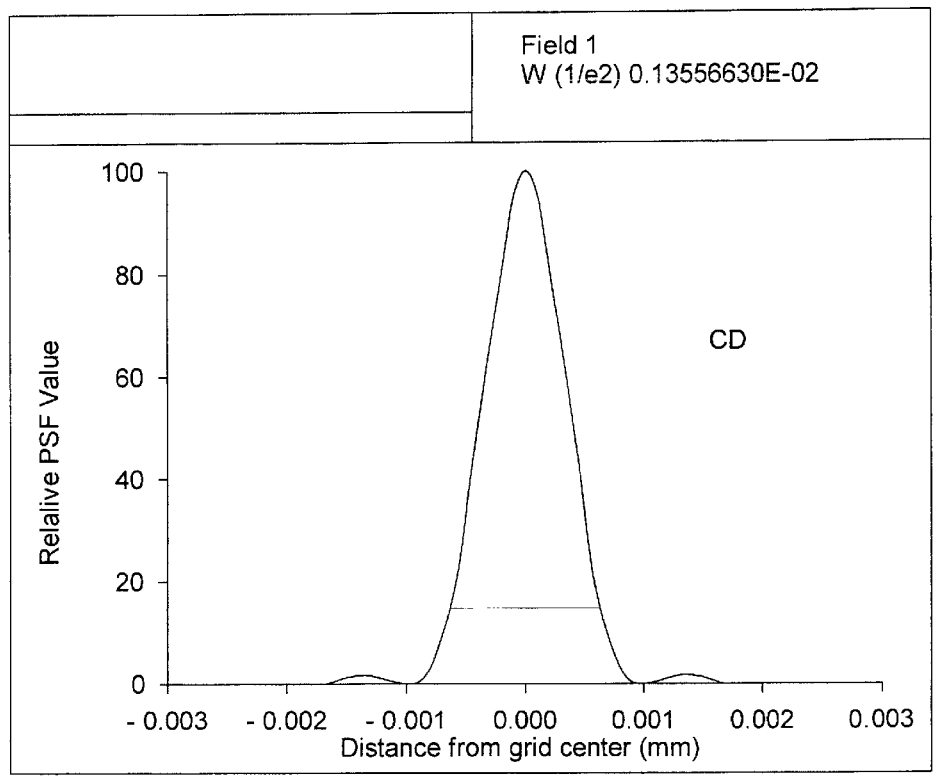
FIG. 6 is a diagram showing spot profiles on an optical information recording medium for each of DVD and CD.
Figure 6:
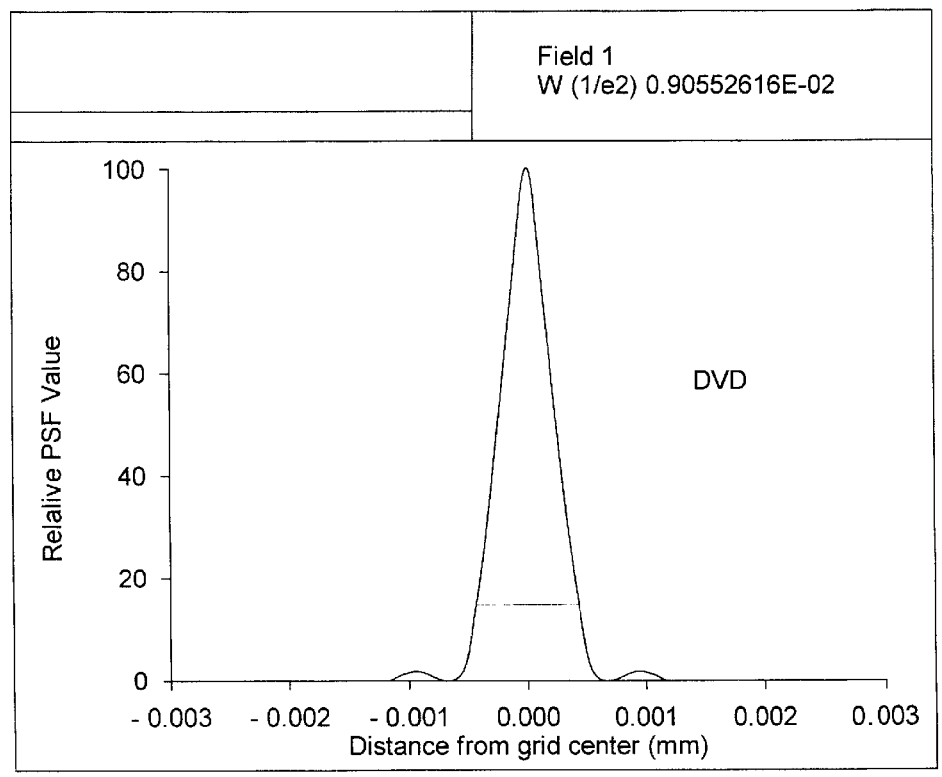

FIG. 6 shows the spot profiles on the optical information recording media of DVD and CD respectively, and it is possible to confirm that the spot diameter corresponding to the necessary numerical aperture is obtained.

TABLE 2

|  | Example 1 |
|---|---|
| λ = 655 nm, T = 25° C. | 0.003 λrms |
| λ = 645 nm, T = 25° C. | 0.018 λrms |
| λ = 661 nm, T = 55° C. | 0.017 λrms |
| CD spherical aberration stepped amount | 8.4 μm |
| CD outermost spherical aberration | 32.5 μm |

TABLE 2-continued

|  | Example 1 |
|---|---|
| Necessary numerical aperture | 0.60/0.45 |

Example 2

This example is the second embodiment stated above. Table 3 shows the objective lens data. A symbol i shows the face number, and i=1 means diaphragm. Further, the diffractive surface is formed on the surface of the objective lens, closer to the laser side, i=2 is data in the common region, and i=2' is data in the exclusive region. Further i=4, and i=5 mean the optical information recording media.

Still further, "a certain point h" means the switching point of the areas, representing h=1.0951 mm in this embodiment. Still further, the step amount δ is 4.1 μm at the certain point h on the basic aspheric surface of the diffractive surface, and when it is changed to diffraction substantial form, the step amount is 2.6 μm. Though established like this, an amount of discontinuity of the spherical aberration can be corrected in terms of the aberration correction to the same level of that of the Example 1, which is no problem for practical use.

Table 4 shows the difference of spherical aberration between the present example and the comparative example.

TABLE 3

| No.i surface | ri | di (655 nm) | ni (655 nm) | di (785 nm) | ni (785 nm) | |
|---|---|---|---|---|---|---|
| 1 | ∞ | 0.0 | 1.0 | 0.0 | 1.0 | Diaphragm aperture diameter φ2.796 mm |
| 2 | 1.45979 | 1.2 | 1.54094 | 1.2 | 1.53716 | |
| 2' | 1.57087 | 1.19862 | 1.54094 | 1.19862 | 1.53716 | |
| 3 | −6.5648 | 1.27787 | 1.0 | 0.90801 | 1.0 | |
| 4 | ∞ | 0.6 | 1.57752 | 1.2 | 1.57063 | |
| 5 | ∞ | | | | | |

Aspherical data
The sedcond surface (0 < h < 1.0951 mm : DVD/CD common region)
Aspherical coefficient

| κ | −1.7548 × E − 0 | | |
|---|---|---|---|
| A1 | +4.05003 × E − 2 | P1 | 4.0 |
| A2 | +3.14654 × E − 3 | P2 | 6.0 |
| A3 | −5.72872 × E − 3 | P3 | 8.0 |
| A4 | +1.16004 × E − 3 | P4 | 10.0 |

Light path difference function
(Coefficient of light path difference function:
Standard wavelength 720 nm)

| B4 | −6.75958 × E − 3 |
|---|---|
| B6 | +2.19750 × E − 3 |
| B8 | −2.44083 × E − 3 |
| B10 | +6.53100 × E − 4 |

The second surface (1.0951 mm < h : DVD exclusive region)
Aspherical coefficient

| κ | −2.37743 × E − 1 | | |
|---|---|---|---|
| A1 | +2.65976 × E − 2 | P1 | 4.0 |
| A2 | −1.62599 × E − 2 | P2 | 6.0 |
| A3 | −3.3313 × E − 3 | P3 | 8.0 |
| A4 | +1.17216 × E − 3 | P4 | 10.0 |

Light path difference function
(coefficient of light path difference function:
standard wavelength 655 nm)

| B2 | −1.09818 × E − 2 |
|---|---|
| B4 | +8.60593 × E − 3 |
| B6 | −1.77199 × E − 3 |
| B8 | −3.35676 × E − 3 |
| B10 | +1.18213 × E − 3 |

The third surface
Aspherical coefficient

| κ | +5.90481 × E − 0 | | |
|---|---|---|---|
| A1 | +4.23950 × E − 2 | P1 | 4.0 |
| A2 | −8.29666 × E − 3 | P2 | 6.0 |
| A3 | −2.07583 × E − 2 | P3 | 8.0 |
| A4 | +2.23298 × E − 2 | P4 | 10.0 |
| A5 | −9.11000 × E − 3 | P5 | 12.0 |
| A6 | +1.38455 × E − 3 | P6 | 14.0 |

TABLE 4

| | Example 2 |
|---|---|
| λ = 655 nm, T = 25° C. | 0.003λ rms |
| λ = 645 nm, T = 25° C. | 0.012λ rms |
| λ = 661 nm, T = 55° C. | 0.011λ rms |
| CD spherical aberration stepped amount | 13 μm |
| CD outermost spherical aberration amount | 46 μm |
| Basic aspheric surface stepped length | 4.1 μm |
| Necessary numerical aperture | 0.60/0.47 |

Example 3

Example 3 is an example corresponding to the second embodiment as same as Example 2.

The data of the objective lens are indicated in Table 5 and the variance of the spherical aberration component of the wavefront aberration is indicated in Table 6.

TABLE 5

| f1 = 3.36 mm | | DVD | | CD | | |
|---|---|---|---|---|---|---|
| No.i surface | ri | di (655 nm) | ni (655 nm) | di (785 nm) | ni (785 nm) | |
| 0 | | ∞ | 1.0 | ∞ | 1.0 | Light emitting point |
| 1 | ∞ | 0 | 1.0 | 0 | 1.0 | Diaphragm aperture diameter φ4.03 mm |
| 2' | 1.9401 | 2.2023 | 1.52915 | 2.2023 | 1.52541 | objective lens |
| 2 | 2.081 | 2.2 | 1.52915 | 2.2 | 1.52541 | |
| 3 | −7.7425 | 1.7499 | 1.0 | 1.3873 | 1.0 | |
| 4 | ∞ | 0.6 | 1.57685 | 1.2 | 1.57063 | disk |
| 5 | ∞ | | 1.0 | | 1.0 | |

Aspherical data
The second surface (h < 1.724 mm: Exclusive region)
Aspherical coefficient

| κ | −6.1561 × E − 1 | | |
|---|---|---|---|
| A1 | −1.3167 × E − 2 | P1 | 4.0 |
| A2 | +9.5822 × E − 4 | P2 | 6.0 |
| A3 | +5.3625 × E − 4 | P3 | 8.0 |
| A4 | −5.1391 × E − 5 | P4 | 10.0 |
| A5 | −7.7984 × E − 6 | P5 | 12.0 |

Optical path difference function
(Coefficient of the optical path difference function:
Standard wavelength 655 nm)

| B2 | +7.5522 × E − 3 |
|---|---|
| B4 | −8.6739 × E − 3 |
| B6 | +2.9392 × E − 3 |
| B8 | −4.4636 × E − 4 |
| B10 | +2.5503 × E − 5 |

The second surface (h < 1.724 mm: Common region)
Aspherical coefficient

| κ | −2.7919 × E − 0 | | |
|---|---|---|---|
| A1 | +3.0085 × E − 2 | P1 | 4.0 |
| A2 | −4.3858 × E − 3 | P2 | 6.0 |
| A3 | +7.0599 × E − 4 | P3 | 8.0 |
| A4 | −6.0461 × E − 5 | P4 | 10.0 |

Optical path difference function
(Coefficient of the optical path difference function:
Standard wavelength 730 nm)

| B2 | 0.0 |
|---|---|
| B4 | −1.4891 × E − 3 |
| B6 | +7.2906 × E − 5 |
| B8 | −4.4409 × E − 5 |
| B10 | +2.8827 × E − 6 |

The third surface
Aspherical coefficient

| κ | +1.2215 × E + 01 | | |
|---|---|---|---|
| A1 | +0.26642 × E − 1 | P1 | 4.0 |
| A2 | −0.11604 × E − 1 | P2 | 6.0 |
| A3 | +0.57574 × E − 2 | P3 | 8.0 |
| A4 | −0.16622 × E − 2 | P4 | 10.0 |
| A5 | +0.22803 × E − 3 | P5 | 12.0 |
| A6 | −0.95715 × E − 5 | P6 | 14.0 |

TABLE 6

|  | Example 3 |
|---|---|
| $\lambda = 655$ nm, T = 25° C. | 0.002$\lambda$ rms |
| $\lambda = 645$ nm, T = 25° C. | 0.019$\lambda$ rms |
| $\lambda = 661$ nm, T = 55° C. | 0.022$\lambda$ rms |
| CD spherical aberration stepped amount | 14 $\mu$m |
| CD outermost spherical aberration amount | 37 $\mu$m |
| Basic aspheric surface stepped length | 2.3 $\mu$m |
| Necessary numerical aperture | 0.60/0.51 |

Example 4

Example 4 is an example corresponding to the second embodiment as same as Example 2.

The data of the objective lens are indicated in Table 7 and the variance of the spherical aberration component of the wavefront aberration is indicated in Table 8.

TABLE 7

| f1 = 3.22 mm | | DVD NA0.65 | | CD NA0.50 | | |
|---|---|---|---|---|---|---|
| No.i surface | ri | di (660 nm) | ni (660 nm) | di (785 nm) | ni (785 nm) | |
| 0 |  | ∞ | 1.0 | ∞ | 1.0 | Light emitting point |
| 1 | ∞ | 0 | 1.0 | 0 | 1.0 | Diaphragm aperture diameter Φ4.19 mm |
| 2' | 1.86991 | 1.95631 | 1.52897 | 1.95631 | 1.52541 | objective lens |
| 2 | 1.96569 | 1.94 | 1.52897 | 1.94 | 1.52541 | |
| 3 | −8.40241 | 1.7401 | 1.0 | 1.3751 | 1.0 | |
| 4 | ∞ | 0.6 | 1.57721 | 1.2 | 1.57063 | disk |
| 5 | ∞ |  | 1.0 |  | 1.0 | |

Aspherical data
The second surface (h > 1.620 mm: Exclusive region)
Aspherical coefficient

| $\kappa$ | −0.38630 × E − 0 | | |
|---|---|---|---|
| A1 | −3.6881 × E − 3 | P1 | 4.0 |
| A2 | −7.6396 × E − 3 | P2 | 6.0 |
| A3 | +2.7410 × E − 3 | P3 | 8.0 |
| A4 | +1.3137 × E − 5 | P4 | 10.0 |
| A5 | −3.2928 × E − 4 | P5 | 12.0 |
| A6 | +8.8661 × E − 5 | P6 | 14.0 |
| A7 | −7.7648 × E − 6 | P7 | 16.0 |

Optical path difference function
(Coefficient of the optical path difference function:
Standard wavelength 660 nm)

| B2 | −2.8433 × E − 3 |
|---|---|
| B4 | −2.2070 × E − 4 |
| B6 | +2.9686 × E − 4 |
| B8 | −2.4044 × E − 4 |
| B10 | +3.4921 × E − 5 |

The second surface (h < 1.620 mm: Common region)
Aspherical coefficient

| $\kappa$ | −1.7051 × E − 0 | | |
|---|---|---|---|
| A1 | +1.8305 × E − 2 | P1 | 4.0 |
| A2 | −2.3146 × E − 3 | P2 | 6.0 |
| A3 | +2.5402 × E − 3 | P3 | 8.0 |
| A4 | −2.3158 × E − 3 | P4 | 10.0 |
| A5 | +1.0966 × E − 3 | P5 | 12.0 |
| A6 | −2.6244 × E − 4 | P6 | 14.0 |
| A7 | +2.5284 × E − 5 | P7 | 16.0 |

TABLE 7-continued

Optical path difference function
(Coefficient of the optical path difference function:
Standard wavelength 720 nm)

| | |
|---|---|
| B2 | 0.0 |
| B4 | $-1.6819 \times E - 3$ |
| B6 | $+1.0984 \times E - 4$ |
| B8 | $-1.1022 \times E - 4$ |
| B10 | $+1.3615 \times E - 5$ |

The third surface
Aspherical coefficient

| | | | |
|---|---|---|---|
| κ | $+6.5698 \times E - 0$ | | |
| A1 | $+0.22484 \times E - 1$ | P1 | 4.0 |
| A2 | $-0.11494 \times E - 1$ | P2 | 6.0 |
| A3 | $+0.51114 \times E - 2$ | P3 | 8.0 |
| A4 | $-0.13723 \times E - 2$ | P4 | 10.0 |
| A5 | $+0.22696 \times E - 3$ | P5 | 12.0 |
| A6 | $-0.27661 \times E - 4$ | P6 | 14.0 |
| A7 | $+0.18819 \times E - 5$ | P7 | 16.0 |

TABLE 8

| | Example 4 |
|---|---|
| λ = 660 nm, T = 25° C. | 0.002λ rms |
| λ = 650 nm, T = 25° C. | 0.021λ rms |
| λ = 666 nm, T = 55° C. | 0.033λ rms |
| CD spherical aberration stepped amount | 13 μm |
| CD outermost spherical aberration amount | 93 μm |
| Basic aspheric surface stepped length | 16.3 μm |
| Necessary numerical aperture | 0.65/0.50 |

Figure 8:
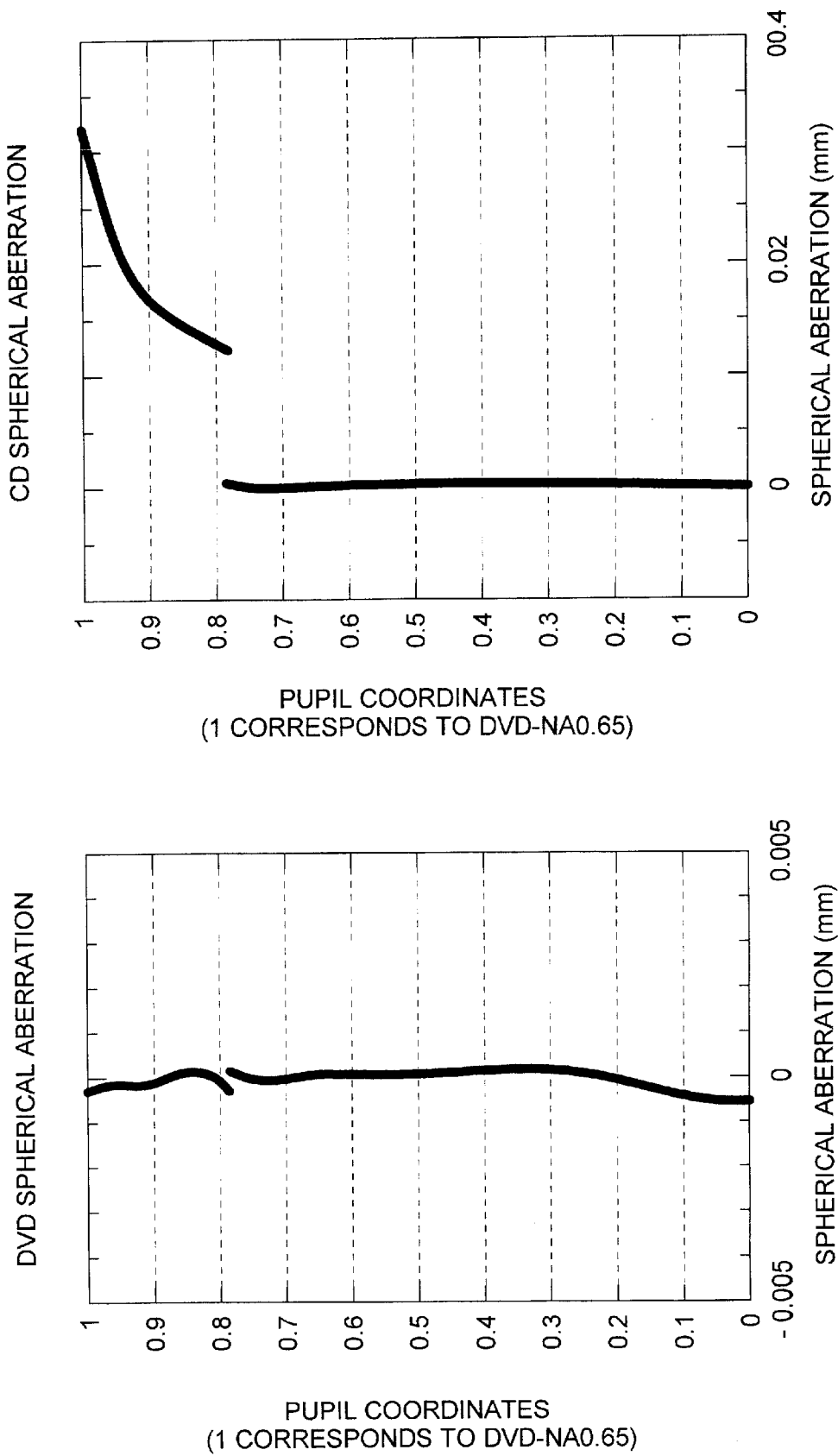
FIG. 8 shows a spherical aberration diagram for each of DVD and CD.
Figure 9:
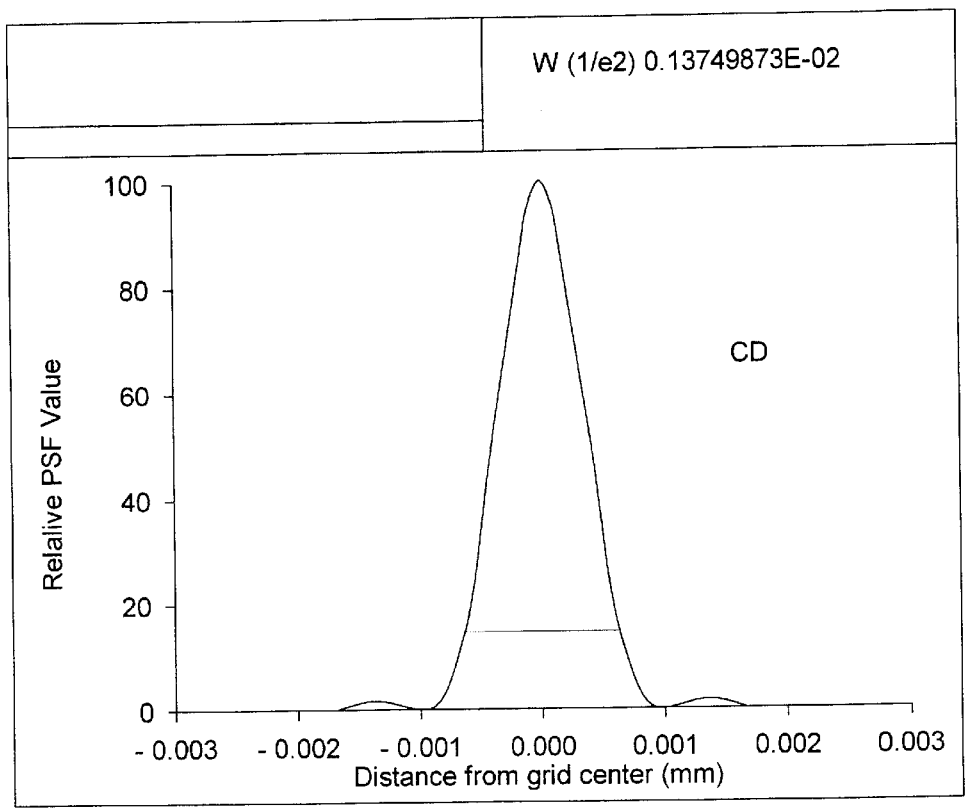
FIG. 9 is a diagram showing spot profiles on an optical information recording medium for each of DVD and CD.
Figure 9:
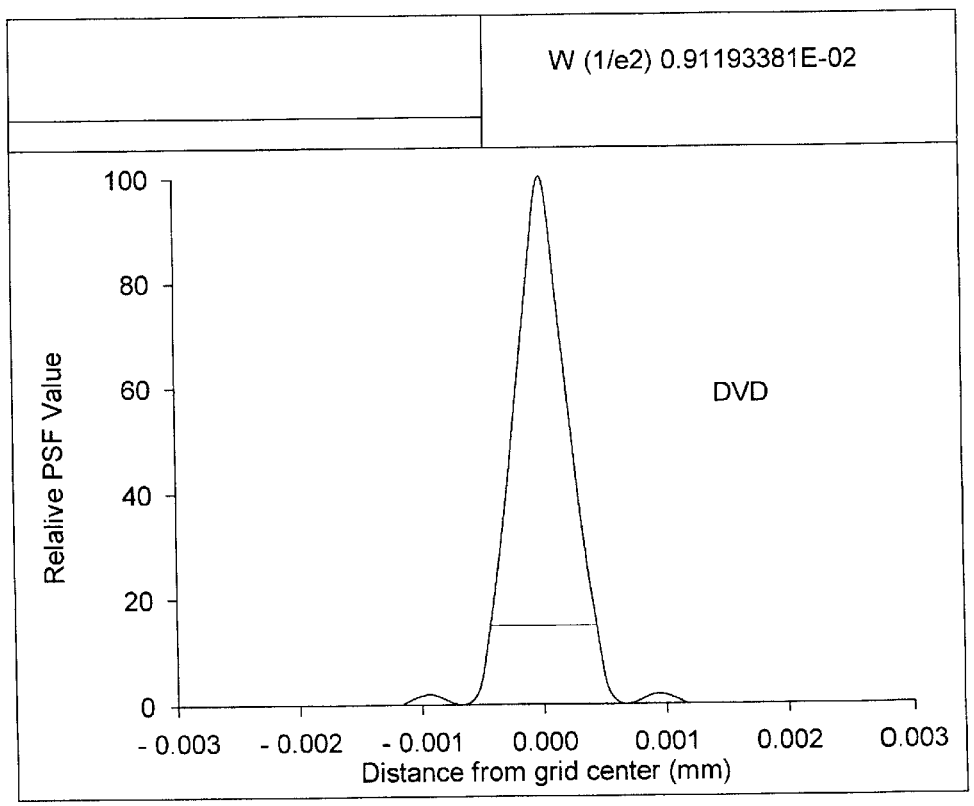

FIG. 8 shows spherical aberration charts respectively for DVD and CD. Further FIG. 9 shows the spot profiles on information recording surfaces, and it can be confirmed that the spot diameter corresponding to the necessary numerical aperture is obtained even in the present example.

As explained above, the invention makes it possible to provide with an objective lens that is balanced in terms of spherical aberration deterioration, namely, is resistant to error factors even for the occasion even when the laser oscillation wavelength variation and the refractive index variation of the objective lens material are varied due to the variation of the environmental temperature, or for the occasion even when the laser oscillation wavelength is simply shifted, and also possible to provide with an optical pickup apparatus that is equipped with the objective lens.

What is claimed is:

1. An optical pickup apparatus for conducting recording or reproducing, or both, information of a first optical information recording medium equipped with a first transparent plate having a thickness of $t_1$ and a second optical information recording medium equipped with a second transparent plate having a thickness of $t_2$, wherein $t_1$ is less than $t_2$, comprising:

a first light source to emit a first light flux having a wavelength of $\lambda_1$ to the first optical information recording medium so as to conduct recording or reproducing, or both, information of the first optical information recording medium;

a second light source to emit a second light flux having a wavelength of $\lambda_2$, wherein $\lambda_1$ is less than $\lambda_2$, to the second optical information recording medium so as to conduct recording or reproducing, or both, information of the second optical information recording medium;

a converging optical system including a single objective lens made of a plastic material and converging the first light flux onto a recording surface of the first optical information recording medium or the second light flux onto a recording surface of the second optical information recording medium through the respective transparent plate; and a diaphragm having an aperture used for both of the first and second optical information recording medium;

wherein a diffractive section including a plurality of ring-shaped zones is provided on at least one side surface of the objective lens within an effective diameter of the one side surface, the diffractive section has a continuous basic aspheric surface, the pitch of the plurality of ring-shaped zones becomes gradually small from the optical axis to a point h within the effective diameter and the pitch increases at the point h;

wherein at the time of conducting recording or reproducing information of the first optical information recording medium, an aberration of the first light flux having passed through the diffractive section is corrected lower than a diffraction limit;

wherein in a forward optical system from the second light source to the recording surface of the second information recording medium at the time of conducting recording or reproducing information of the second optical information recording medium, the second light flux has a spherical aberration discontinuous portion at the point h where a spherical aberration-stepped amount is 7 μm to 40 μm, an aberration of a partial light flux of the second light flux having passed through an inner part of the diffractive section inside of the point h is corrected lower than a diffraction limit, and a spherical aberration of a light ray of the second light flux having passed through the outermost portion of the aperture of the diaphragm is 7 μm to 40 μm.

2. The optical pickup apparatus of claim 1, wherein the point h satisfies the following conditional formula:

$$f_2(NA_2-0.03)\text{mm} \leq h \leq f_2(NA_2+0.03)\text{mm}$$

where $f_2$ is a focal length of the objective lens at the time of conducting recording or reproducing, or both, information of the second optical information recording medium and $NA_2$ is a necessary numerical aperture for the second optical information medium.

3. The optical pickup apparatus of claim 1, wherein at the time of conducting recording or reproducing information of the second optical information recording medium, the spherical aberration of the light ray of the second light flux having passed through the outermost portion of the aperture of the diaphragm is 34 μm or less.

4. The optical pickup apparatus of claim 1, wherein at the time of conducting recording or reproducing information of the second optical information recording medium, the spherical aberration of the light ray of the second light flux having passed through the outermost portion of the aperture of the diaphragm is 30 μm or more.

5. The optical pickup apparatus of claim 1, wherein in the forward optical system at the time of conducting recording or reproducing information of the second optical information recording medium, the spherical aberration-stepped amount on the spherical aberration discontinuous portion at the point h is 9 μm or less.

6. The optical pickup apparatus of claim 1, wherein at the time of conducting recording or reproducing information of the second optical information recording medium, a spherical aberration is monotonously changed from the spherical aberration discontinuous portion to the outermost portion of the aperture of the diaphragm.

7. The optical pickup apparatus of claim 1, wherein the following conditional formula is satisfied at the time of conducting recording or reproducing information of the first optical information recording medium, $0.57 < NA_1 < 0.63$, $0.55$ mm $< t_1 < 0.65$ mm, and $640$ nm $< \lambda_1 < 670$ nm, and the following conditional formula is satisfied at the time of conducting recording or reproducing information of the second optical information recording medium, $0.44 < NA_2 < 0.48$, $1.15$ mm $< t_2 < 1.25$ mm, and $770$ nm $< \lambda_2 < 795$ nm, where $NA_1$ is a necessary numerical aperture for the first optical information recording medium and $NA_2$ is a necessary numerical aperture for the second optical information recording medium.

8. An optical pickup apparatus for conducting recording or reproducing, or both, information of a first optical information recording medium equipped with a first transparent plate having a thickness of $t_1$ and a second optical information recording medium equipped with a second transparent plate having a thickness of $t_2$, wherein $t_1$ is less than $t_2$, comprising:

a first light source to emit a first light flux having a wavelength of $\lambda_1$ to the first optical information recording medium so as to conduct recording or reproducing, or both, information of the first optical information recording medium;

a second light source to emit a second light flux having a wavelength of $\lambda_2$, wherein $\lambda_1$ is less than $\lambda_2$, to the second optical information recording medium so as to conduct recording or reproducing, or both, information of the second optical information recording medium;

a converging optical system including a single objective lens made of a plastic material and converging the first light flux onto a recording surface of the first optical information recording medium or the second light flux onto a recording surface of the second optical information recording medium through the respective transparent plate; and a diaphragm having an aperture used for both of the first and second optical information recording medium;

wherein a diffractive section including a plurality of ring-shaped zones is provided on at least one side surface of the objective lens within an effective diameter of the one side surface, the pitch of the plurality of ring-shaped zones becomes gradually small from the optical axis to a point h within the effective diameter and the pitch increases at the point h;

wherein at the time of conducting recording or reproducing information of the first optical information recording medium, an aberration of the first light flux having passed through the diffractive section is corrected lower than a diffraction limit;

wherein in a forward optical system from the second light source to the recording surface of the second information recording medium at the time of conducting recording or reproducing information of the second optical information recording medium, the second light flux has a spherical aberration discontinuous portion at the point h and the diffractive section of the objective lens has a basic aspheric surface which has a discontinuous portion at a position corresponding to the spherical aberration discontinuous portion.

9. The optical pickup apparatus of claim 8, wherein the point h satisfies the following conditional formula:

$$f_2(NA_2-0.03)\text{mm} \leq h \leq f_2(NA_2+0.03)\text{mm}$$

where $f_2$ is a focal length of the objective lens at the time of conducting recording or reproducing, or both, information of the second optical information recording medium and $NA_2$ is a necessary numerical aperture for the second optical information medium.

10. The optical pickup apparatus of claim 8, wherein a length of the discontinuous portion of the basic aspheric surface of the diffractive section is 1 μm to 10 μm.

11. The optical pickup apparatus of claim 8, wherein the spherical aberration-stepped amount on the spherical aberration discontinuous portion is 8 μm to 16 μm.

12. The optical pickup apparatus of claim 8, wherein the following conditional formula is satisfied at the time of conducting recording or reproducing information of the first optical information recording medium, $0.57 < NA_1 < 0.63$, $0.55$ mm $< t_1 < 0.65$ mm, and $640$ nm $< \lambda_1 < 670$ nm, and the following conditional formula is satisfied at the time of conducting recording or reproducing information of the second optical information recording medium, $0.44 < NA_2 < 0.48$, $1.15$ mm $< t_2 < 1.25$ mm, and $770$ nm $< \lambda_2 < 795$ nm, where $NA_1$ is a necessary numerical aperture for the first optical information recording medium and $NA_2$ is a necessary numerical aperture for the second optical information recording medium.

13. An optical pickup apparatus, comprising:

a light source; and an objective lens for recording or reproducing, or both, information of an optical information recording medium;

wherein a diffractive section including a plurality of ring-shaped zones is provided on at least one side surface of the objective lens, the pitch of the plurality of ring-shaped zones monotonously decreases from the optical axis to a point h, the pitch increases at both neighboring sides of the point h, and the pitch monotonously decreases from the point h to a periphery of the diffractive section; and wherein the diffractive section has a stepped length of 1 µm to 10 µm in a depth such that a thickness of the objective lens becomes thin by the stepped difference.

14. An objective lens for use in an optical pickup apparatus for conducting recording or reproducing, or both, information of a first optical information recording medium equipped with a first transparent plate having a thickness of $t_1$ and a second optical information recording medium equipped with a second transparent plate having a thickness of $t_2$, wherein $t_1$ is less than $t_2$, the optical pickup apparatus is provided with a first light source to emit a first light flux having a wavelength of $\lambda_1$ to the first optical information recording medium so as to conduct recording or reproducing, or both, information of the first optical information recording medium;

a second light source to emit a second light flux having a wavelength of $\lambda_2$, wherein $\lambda_1$ is less than $\lambda_2$, to the second optical information recording medium so as to conduct recording or reproducing, or both, information of the second optical information recording medium;

a converging optical system including the objective lens being a single objective lens made of a plastic material and converging the first light flux onto a recording surface of the first optical information recording medium or the second light flux onto a recording surface of the second optical information recording medium through the respective transparent plate; and a diaphragm having an aperture used for both of the first and second optical information recording medium, the objective lens, comprising:

a diffractive section including a plurality of ring-shaped zones provided on at least one side surface of the objective lens within an effective diameter of the one side surface, the diffractive section has a continuous basic aspheric surface, wherein the pitch of the plurality of ring-shaped zones becomes gradually small from the optical axis to a point h within the effective diameter and the pitch increases at the point h;

wherein at the time of conducting recording or reproducing information of the first optical information recording medium, an aberration of the first light flux having passed through the diffractive section is corrected lower than a diffraction limit;

wherein in a forward optical system from the second light source to the recording surface of the second information recording medium at the time of conducting recording or reproducing information of the second optical information recording medium, the second light flux has a spherical aberration discontinuous portion at the point h where a spherical aberration-stepped amount is 7 µm to 40 µm, an aberration of a partial light flux of the second light flux having passed through an inner part of the diffractive section inside of the point h is corrected lower than a diffraction limit, and a spherical aberration of a light ray of the second light flux having passed through the outermost portion of the aperture of the diaphragm is 7 µm to 40 µm.

15. The objective lens of claim 14, wherein the point h satisfies the following conditional formula:

$$f_2(NA_2-0.03)\text{mm} \leq h \leq f_2(NA_2+0.03)\text{mm}$$

where $f_2$ is a focal length of the objective lens at the time of conducting recording or reproducing, or both, information of the second optical information recording medium and $NA_2$ is a necessary numerical aperture for the second optical information medium.

16. The objective lens of claim 14, wherein at the time of conducting recording or reproducing information of the second optical information recording medium, the spherical aberration of the light ray of the second light flux having passed through the outermost portion of the aperture of the diaphragm is 34 µm or less.

17. The objective lens of claim 14, wherein at the time of conducting recording or reproducing information of the second optical information recording medium, the spherical aberration of the light ray of the second light flux having passed through the outermost portion of the aperture of the diaphragm is 30 µm or more.

18. The objective lens of claim 14, wherein in the forward optical system at the time of conducting recording or reproducing information of the second optical information recording medium, the spherical aberration-stepped amount on the spherical aberration discontinuous portion at the point h is 9 µm or less.

19. The objective lens of claim 14, wherein at the time of conducting recording or reproducing information of the second optical information recording medium, a spherical aberration is monotonously changed from the spherical aberration discontinuous portion to the outermost portion of the aperture of the diaphragm.

20. The objective lens of claim 14, wherein the following conditional formula is satisfied at the time of conducting recording or reproducing information of the first optical information recording medium, $0.57 < NA_1 < 0.63$, $0.55 \text{ mm} < t_1 < 0.65 \text{ mm}$, and $640 \text{ nm} < \lambda_1 < 670 \text{ nm}$, and the following conditional formula is satisfied at the time of conducting recording or reproducing information of the second optical information recording medium, $0.44 < NA_2 < 0.48$, $1.15 \text{ mm} < t_2 < 1.25 \text{ mm}$, and $770 \text{ nm} < \lambda_2 < 795 \text{ nm}$, where $NA_1$ is a necessary numerical aperture for the first optical information recording medium and $NA_2$ is a necessary numerical aperture for the second optical information recording medium.

21. An objective lens for use in an optical pickup apparatus for conducting recording or reproducing, or both, information of a first optical information recording medium equipped with a first transparent plate having a thickness of $t_1$ and a second optical information recording medium equipped with a second transparent plate having a thickness of $t_2$, wherein $t_1$ is less than $t_2$, the optical pickup apparatus is provided with a first light source to emit a first light flux having a wavelength of $\lambda_1$ to the first optical information recording medium so as to conduct recording or reproducing, or both, information of the first optical information recording medium;

a second light source to emit a second light flux having a wavelength of $\lambda_2$, wherein $\lambda_1$ is less than $\lambda_2$, to the second optical information recording medium so as to conduct recording or reproducing, or both, information of the second optical information recording medium;

a converging optical system including the objective lens being a single objective lens made of a plastic material and converging the first light flux onto a recording surface of the first optical information recording medium or the second light flux onto a recording surface of the second optical information recording medium through the respective transparent plate; and a diaphragm having an aperture used for both of the first and second optical information recording medium;

the objective lens, comprising:

a diffractive section including a plurality of ring-shaped zones provided on at least one side surface of the objective lens within an effective diameter of the one side surface, wherein the pitch of the plurality of ring-shaped zones becomes gradually small from the optical axis to a point h within the effective diameter and the pitch increases at the point h;

wherein at the time of conducting recording or reproducing information of the first optical information recording medium, an aberration of the first light flux having passed through the diffractive section is corrected lower than a diffraction limit;

wherein in a forward optical system from the second light source to the recording surface of the second information recording medium at the time of conducting recording or reproducing information of the second optical information recording medium, the second light flux has a spherical aberration discontinuous portion at the point h and the diffractive section of the objective lens has a basic aspheric surface which has a discontinuous portion at a position corresponding to the spherical aberration discontinuous portion.

22. The objective lens of claim 21, wherein the point h satisfies the following conditional formula:

$$f_2(NA_2-0.03)\text{mm} \leq h \leq f_2(NA_2+0.03)\text{mm}$$

where $f_2$ is a focal length of the objective lens at the time of conducting recording or reproducing, or both, information of the second optical information recording medium and $NA_2$ is a necessary numerical aperture for the second optical information medium.

23. The objective lens of claim 21, wherein a length of the discontinuous portion of the basic aspheric surface of the diffractive section 1 μm to 10 μm.

24. The objective lens of claim 21, wherein the spherical aberration-stepped amount on the spherical aberration discontinuous portion is 8 μm to 16 μm.

25. The objective lens of claim 21, wherein the following conditional formula is satisfied at the time of conducting recording or reproducing information of the first optical information recording medium, 0.57<$NA_1$<0.63, 0.55 mm<$t_1$<0.65 mm, and 640 nm<$\lambda_1$<670 nm, and the following conditional formula is satisfied at the time of conducting recording or reproducing information of the second optical information recording medium, 0.44<$NA_2$<0.48, 1.15 mm<$t_2$<1.25 mm, and 770 nm<$\lambda_2$<795 nm, where $NA_1$ is a necessary numerical aperture for the first optical information recording medium and $NA_2$ is a necessary numerical aperture for the second optical information recording medium.

26. An objective lens for recording or reproducing, or both, information of an optical information recording medium, comprising:

a diffractive section including a plurality of ring-shaped zones provided on at least one side surface of the objective lens, wherein the pitch of the plurality of ring-shaped zones monotonously decreases from the optical axis to a point h, the pitch increases at both neighboring sides of the point h, and the pitch monotonously decreases from the point h to a periphery of the diffractive section; and wherein the diffractive section has a stepped length of 1 μm to 10 μm in a depth such that a thickness of the objective lens becomes thin by the stepped difference.

27. An optical pickup apparatus for conducting recording or reproducing, or both, information of a first optical information recording medium equipped with a first transparent plate having a thickness of $t_1$ and a second optical information recording medium equipped with a second transparent plate having a thickness of $t_2$, wherein $t_1$ is less than $t_2$, comprising:

a first light source to emit a first light flux having a wavelength of $\lambda_1$ to the first optical information recording medium so as to conduct recording or reproducing, or both, information of the first optical information recording medium;

a second light source to emit a second light flux having a wavelength of $\lambda_2$, wherein $\lambda_1$ is less than $\lambda_2$, to the second optical information recording medium so as to conduct recording or reproducing, or both, information of the second optical information recording medium;

a converging optical system including a single objective lens made of a plastic material and converging the first light flux onto a recording surface of the first optical information recording medium or the second light flux onto a recording surface of the second optical information recording medium through the respective transparent plate; and a diaphragm having an aperture used for both of the first and second optical information recording medium;

wherein a diffractive section including a plurality of ring-shaped zones is provided on at least one side surface of the objective lens within an effective diameter of the one side surface, the pitch of the plurality of ring-shaped zones becomes gradually small from the optical axis to a point h within the effective diameter and the pitch increases at the point h;

wherein at the time of conducting recording or reproducing information of the first optical information recording medium, an aberration of the first light flux having passed through the diffractive section is corrected lower than a diffraction limit;

wherein in a forward optical system from the second light source to the recording surface of the second information recording medium at the time of conducting recording or reproducing information of the second optical information recording medium, the second light flux has a spherical aberration discontinuous portion at the point h where a spherical aberration-stepped amount is 10 μm to 30 μm, an aberration of a partial light flux of the second light flux having passed through an inner part of the diffractive section inside of the point h is corrected lower than a diffraction limit, and a spherical aberration of a light ray of the second light flux having passed through the outermost portion of the aperture of the diaphragm is 40 μm to 70 μm, and wherein the following conditional formula is satisfied:

0.58<$NA_1$<0.62 and 0.48<$NA_2$<0.56 where $NA_1$ is a necessary numerical aperture for the first optical information recording medium and $NA_2$ is a necessary numerical aperture for the second optical information recording medium.

28. The optical pickup apparatus of claim 27, wherein the diffractive section of the objective lens has a basic aspheric surface which has a discontinuous portion at the point h and a stepped length of the discontinuous portion is 1 μm to 10 μm.

29. An optical pickup apparatus for conducting recording or reproducing, or both, information of a first optical information recording medium equipped with a first transparent plate having a thickness of $t_1$ and a second optical information recording medium equipped with a second transparent plate having a thickness of $t_2$, wherein $t_1$ is less than $t_2$, comprising:

a first light source to emit a first light flux having a wavelength of $\lambda_1$ to the first optical information recording medium so as to conduct recording or reproducing, or both, information of the first optical information recording medium;

a second light source to emit a second light flux having a wavelength of $\lambda_2$, wherein $\lambda_1$ is less than $\lambda_2$, to the second optical information recording medium so as to conduct recording or reproducing, or both, information of the second optical information recording medium;

a converging optical system including a single objective lens made of a plastic material and converging the first light flux onto a recording surface of the first optical information recording medium or the second light flux onto a recording surface of the second optical information recording medium through the respective transparent plate; and a diaphragm having an aperture used for both of the first and second optical information recording medium;

wherein a diffractive section including a plurality of ring-shaped zones is provided on at least one side surface of the objective lens within an effective diameter of the one side surface, the pitch of the plurality of ring-shaped zones becomes gradually small from the optical axis to a point h within the effective diameter and the pitch increases at the point h;

wherein at the time of conducting recording or reproducing information of the first optical information recording medium, an aberration of the first light flux having passed through the diffractive section is corrected lower than a diffraction limit;

wherein in a forward optical system from the second light source to the recording surface of the second information recording medium at the time of conducting recording or reproducing information of the second optical information recording medium, the second light flux has a spherical aberration discontinuous portion at the point h where a spherical aberration-stepped amount is 10 μm to 30 μm, an aberration of a partial light flux of the second light flux having passed through an inner part of the diffractive section inside of the point h is corrected lower than a diffraction limit, and a spherical aberration of a light ray of the second light flux having passed through the outermost portion of the aperture of the diaphragm is 50 μm to 100 μm, and wherein the following conditional formula is satisfied:

$$0.62 < NA_1 < 0.68 \text{ and } 0.48 < NA_2 < 0.56$$

where $NA_1$ is a necessary numerical aperture for the first optical information recording medium and $NA_2$ is a necessary numerical aperture for the second optical information recording medium.

30. The optical pickup apparatus of claim 29, wherein the diffractive section of the objective lens has a basic aspheric surface which has a discontinuous portion at the point h and a stepped length of the discontinuous portion is 1 μm to 20 μm.

31. An objective lens for use in an optical pickup apparatus for conducting recording or reproducing, or both, information of a first optical information recording medium equipped with a first transparent plate having a thickness of $t_1$ and a second optical information recording medium equipped with a second transparent plate having a thickness of $t_2$, wherein $t_1$ is less than $t_2$, the optical pickup apparatus is provided with a first light source to emit a first light flux having a wavelength of $\lambda_1$ to the first optical information recording medium so as to conduct recording or reproducing, or both, information of the first optical information recording medium;

a second light source to emit a second light flux having a wavelength of $\lambda_2$, wherein $\lambda_1$ is less than $\lambda_2$, to the second optical information recording medium so as to conduct recording or reproducing, or both, information of the second optical information recording medium;

a converging optical system including the objective lens being a single objective lens made of a plastic material and converging the first light flux onto a recording surface of the first optical information recording medium or the second light flux onto a recording surface of the second optical information recording medium through the respective transparent plate; and a diaphragm having an aperture used for both of the first and second optical information recording medium;

the objective lens, comprising:

a diffractive section including a plurality of ring-shaped zones provided on at least one side surface of the objective lens within an effective diameter of the one side surface, wherein the pitch of the plurality of ring-shaped zones becomes gradually small from the optical axis to a point h within the effective diameter and the pitch increases at the point h;

wherein at the time of conducting recording or reproducing information of the first optical information recording medium, an aberration of the first light flux having passed through the diffractive section is corrected lower than a diffraction limit;

wherein in a forward optical system from the second light source to the recording surface of the second information recording medium at the time of conducting recording or reproducing information of the second optical information recording medium, the second light flux has a spherical aberration discontinuous portion at the point h where a spherical aberration-stepped amount is 10 μm to 30 μm, an aberration of a partial light flux of the second light flux having passed through an inner part of the diffractive section inside of the point h is corrected lower than a diffraction limit, and a spherical aberration of a light ray of the second light flux having passed through the outermost portion of the aperture of the diaphragm is 40 μm to 70 μm, and wherein the following conditional formula is satisfied:

$$0.58 < NA_1 < 0.62 \text{ and } 0.48 < NA_2 < 0.56$$

where $NA_1$ is a necessary numerical aperture for the first optical information recording medium and $NA_2$ is a necessary numerical aperture for the second optical information recording medium.

32. The objective lens of claim 31, wherein the diffractive section of the objective lens has a basic aspheric surface which has a discontinuous portion at the point h and a stepped length of the discontinuous portion is 1 μm to 10 μm.

33. An objective lens for use in an optical pickup apparatus conducting recording or reproducing, or both, information of a first optical information recording medium equipped with a first transparent plate having a thickness of $t_1$ and a second optical information recording medium equipped with a second transparent plate having a thickness of $t_2$, wherein $t_1$ is less than $t_2$, the optical pickup apparatus is provided with a first light source to emit a first light flux having a wavelength of $\lambda_1$ to the first optical information recording medium so as to conduct recording or reproducing, or both, information of the first optical information recording medium;

a second light source to emit a second light flux having a wavelength of $\lambda_2$, wherein $\lambda_1$ is less than $\lambda_2$, to the second optical information recording medium so as to conduct recording or reproducing, or both, information of the second optical information recording medium;

a converging optical system including the objective lens being a single objective lens made of a plastic material and converging the first light flux onto a recording surface of the first optical information recording medium or the second light flux onto a recording surface of the second optical information recording medium through the respective transparent plate; and a diaphragm having an aperture used for both of the first and second optical information recording medium;

the objective lens, comprising:

a diffractive section including a plurality of ring-shaped zones provided on at least one side surface of the objective lens within an effective diameter of the one side surface, wherein the pitch of the plurality of ring-shaped zones becomes gradually small from the optical axis to a point h within the effective diameter and the pitch increases at the point h;

wherein at the time of conducting recording or reproducing information of the first optical information recording medium, an aberration of the first light flux having passed through the diffractive section is corrected lower than a diffraction limit;

wherein in a forward optical system from the second light source to the recording surface of the second information recording medium at the time of conducting recording or reproducing information of the second optical information recording medium, the second light flux has a spherical aberration discontinuous portion at the point h where a spherical aberration-stepped amount is 10 μm to 30 μm, an aberration of a partial light flux of the second light flux having passed through an inner part of the diffractive section inside of the point h is corrected lower than a diffraction limit, and a spherical aberration of a light ray of the second light flux having passed through the outermost portion of the aperture of the diaphragm is 50 μm to 100 μm, and wherein the following conditional formula is satisfied:

$0.62 \leq NA_1 < 0.68$ and $0.48 < NA_2 < 0.56$ where $NA_1$ is a necessary numerical aperture for the first optical information recording medium and $NA_2$ is a necessary numerical aperture for the second optical information recording medium.

34. The objective lens of claim 33, wherein the diffractive section of the objective lens has a basic aspheric surface which has a discontinuous portion at the point h and a stepped length of the discontinuous portion is 1 μm to 20 μm.

* * * * *